(12) United States Patent
Mizoguchi et al.

(10) Patent No.: US 6,512,545 B1
(45) Date of Patent: Jan. 28, 2003

(54) SOLID-STATE IMAGE PICKUP APPARATUS FOR READING PIXEL SIGNALS OUT AT A HIGH FRAME RATE

(75) Inventors: Toyokazu Mizoguchi, Nagano-ken (JP); Satoshi Kazama, Nagano-ken (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 08/993,705

(22) Filed: Dec. 18, 1997

(30) Foreign Application Priority Data

Dec. 20, 1996 (JP) ............................................. 8-354696

(51) Int. Cl.$^7$ ................................................ H04N 3/14
(52) U.S. Cl. ...................................................... 348/304
(58) Field of Search ................................ 348/302, 303, 348/304, 308, 207, 312, 282, 207.99; 250/208.1; 358/1.2; 377/61, 62, 63, 73

(56) References Cited

U.S. PATENT DOCUMENTS

| | | | | |
|---|---|---|---|---|
| 4,740,828 A | * | 4/1988 | Kinoshita | ................... 348/282 |
| 5,262,871 A | * | 11/1993 | Wilder et al. | ................ 348/308 |
| 5,818,526 A | * | 10/1998 | Nomoto | ...................... 348/302 |
| 5,909,247 A | * | 6/1999 | Hosokai et al. | ............. 348/302 |
| 5,998,778 A | * | 12/1999 | Kimata | ..................... 250/208.1 |

* cited by examiner

Primary Examiner—Wendy R. Garber
Assistant Examiner—Rashawn N. Tillery
(74) Attorney, Agent, or Firm—Armstrong, Westerman & Hattori, LLP

(57) ABSTRACT

In a solid-state image pickup apparatus including a pixel section having a plurality of arrayed pixels and a scanning circuit for scanning the pixel section, the scanning circuit is constructed as having: a shift register section consisting of cascaded shift register units; a signal select section consisting of a plurality of signal select units arranged in a manner corresponding to the shift register units; and a scan control section for generating scan control signal for controlling the signal select unit. Outputs of the shift register units are selectively provided as scanning signal through the signal select units which are controlled by the scan control signal. Thereby, pixel signals corresponding to a full angle of view can be read out at a rapid frame rate even in the high-definition solid-state image pickup apparatus where the number of pixels is very large.

8 Claims, 22 Drawing Sheets

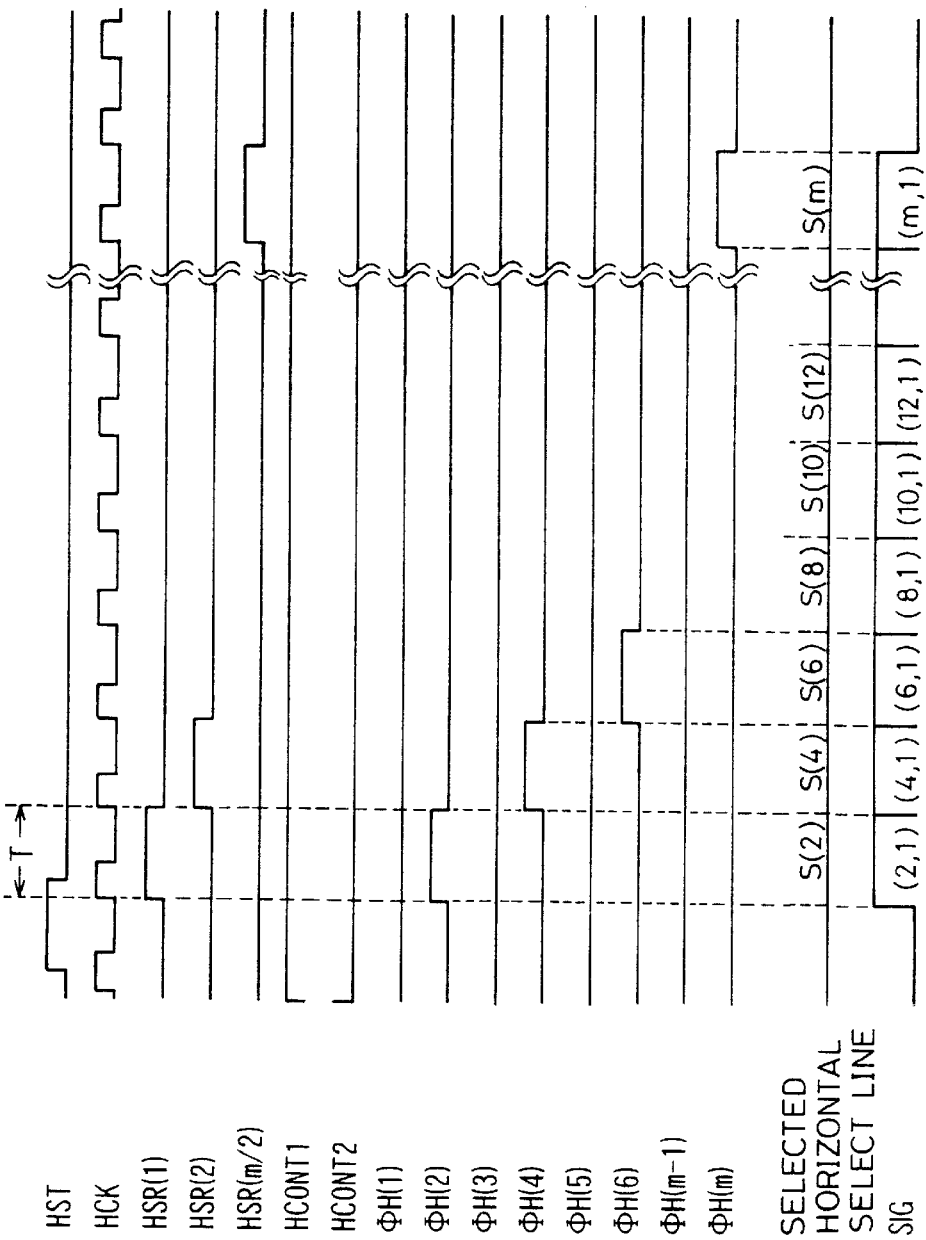

FIG. 6A

| (1,1) | (2,1) | (3,1) | (4,1) | (5,1) | (6,1) | ---- | (m-1,1) | (m,1) |
|---|---|---|---|---|---|---|---|---|
| (1,2) | (2,2) | (3,2) | (4,2) | (5,2) | (6,2) | ---- | (m-1,2) | (m,2) |
| (1,3) | (2,3) | (3,3) | (4,3) | (5,3) | (6,3) | ---- | (m-1,3) | (m,3) |
| (1,4) | (2,4) | (3,4) | (4,4) | (5,4) | (6,4) | ---- | (m-1,4) | (m,4) |
| (1,5) | (2,5) | (3,5) | (4,5) | (5,5) | (6,5) | ---- | (m-1,5) | (m,5) |
| (1,6) | (2,6) | (3,6) | (4,6) | (5,6) | (6,6) | ---- | (m-1,6) | (m,6) |
| (1,n-1) | (2,n-1) | (3,n-1) | (4,n-1) | (5,n-1) | (6,n-1) | ---- | (m-1,n-1) | (m,n-1) |
| (1,n) | (2,n) | (3,n) | (4,n) | (5,n) | (6,n) | ---- | (m-1,n) | (m,n) |

FIG. 6B

| (1,1) | (2,1) | (3,1) | (4,1) | (5,1) | (6,1) | ---- | (m-1,1) | (m,1) |
|---|---|---|---|---|---|---|---|---|
| (1,2) | (2,2) | (3,2) | (4,2) | (5,2) | (6,2) | ---- | (m-1,2) | (m,2) |
| (1,3) | (2,3) | (3,3) | (4,3) | (5,3) | (6,3) | ---- | (m-1,3) | (m,3) |
| (1,4) | (2,4) | (3,4) | (4,4) | (5,4) | (6,4) | ---- | (m-1,4) | (m,4) |
| (1,5) | (2,5) | (3,5) | (4,5) | (5,5) | (6,5) | ---- | (m-1,5) | (m,5) |
| (1,6) | (2,6) | (3,6) | (4,6) | (5,6) | (6,6) | ---- | (m-1,6) | (m,6) |
| (1,n-1) | (2,n-1) | (3,n-1) | (4,n-1) | (5,n-1) | (6,n-1) | ---- | (m-1,n-1) | (m,n-1) |
| (1,n) | (2,n) | (3,n) | (4,n) | (5,n) | (6,n) | ---- | (m-1,n) | (m,n) |

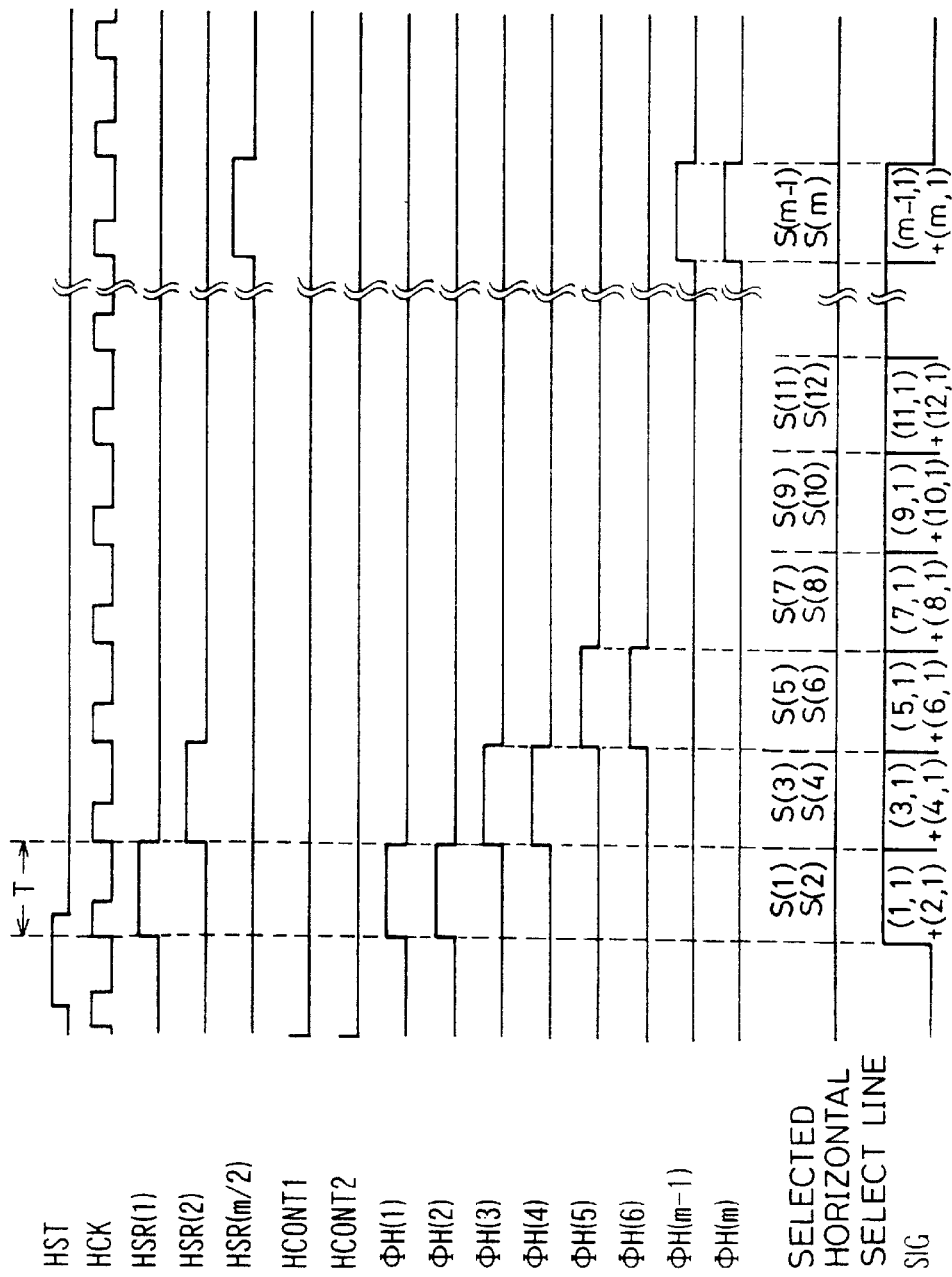

FIG. 8

| (1,1) | (2,1) | (3,1) | (4,1) | (5,1) | (6,1) | ---- | (m-1,1) | (m,1) |
|---|---|---|---|---|---|---|---|---|
| (1,2) | (2,2) | (3,2) | (4,2) | (5,2) | (6,2) | ---- | (m-1,2) | (m,2) |
| (1,3) | (2,3) | (3,3) | (4,3) | (5,3) | (6,3) | ---- | (m-1,3) | (m,3) |
| (1,4) | (2,4) | (3,4) | (4,4) | (5,4) | (6,4) | ---- | (m-1,4) | (m,4) |
| (1,5) | (2,5) | (3,5) | (4,5) | (5,5) | (6,5) | ---- | (m-1,5) | (m,5) |
| (1,6) | (2,6) | (3,6) | (4,6) | (5,6) | (6,6) | ---- | (m-1,6) | (m,6) |

| (1,n-1) | (2,n-1) | (3,n-1) | (4,n-1) | (5,n-1) | (6,n-1) | ---- | (m-1,n-1) | (m,n-1) |
|---|---|---|---|---|---|---|---|---|
| (1,n) | (2,n) | (3,n) | (4,n) | (5,n) | (6,n) | ---- | (m-1,n) | (m,n) |

FIG. 16A

| (1,1) | (2,1) | (3,1) | (4,1) | (5,1) | (6,1) | (7,1) | (8,1) | ---- |
|---|---|---|---|---|---|---|---|---|
| (1,2) | (2,2) | (3,2) | (4,2) | (5,2) | (6,2) | (7,2) | (8,2) | ---- |
| (1,3) | (2,3) | (3,3) | (4,3) | (5,3) | (6,3) | (7,3) | (8,3) | ---- |
| (1,4) | (2,4) | (3,4) | (4,4) | (5,4) | (6,4) | (7,4) | (8,4) | ---- |
| (1,5) | (2,5) | (3,5) | (4,5) | (5,5) | (6,5) | (7,5) | (8,5) | ---- |
| (1,6) | (2,6) | (3,6) | (4,6) | (5,6) | (6,6) | (7,6) | (8,6) | ---- |
| (1,7) | (2,7) | (3,7) | (4,7) | (5,7) | (6,7) | (7,7) | (8,7) | ---- |
| (1,8) | (2,8) | (3,8) | (4,8) | (5,8) | (6,8) | (7,8) | (8,8) | ---- |

FIG. 16B

| (1,1) | (2,1) | (3,1) | (4,1) | (5,1) | (6,1) | (7,1) | (8,1) | ---- |
|---|---|---|---|---|---|---|---|---|
| (1,2) | (2,2) | (3,2) | (4,2) | (5,2) | (6,2) | (7,2) | (8,2) | ---- |
| (1,3) | (2,3) | (3,3) | (4,3) | (5,3) | (6,3) | (7,3) | (8,3) | ---- |
| (1,4) | (2,4) | (3,4) | (4,4) | (5,4) | (6,4) | (7,4) | (8,4) | ---- |
| (1,5) | (2,5) | (3,5) | (4,5) | (5,5) | (6,5) | (7,5) | (8,5) | ---- |
| (1,6) | (2,6) | (3,6) | (4,6) | (5,6) | (6,6) | (7,6) | (8,6) | ---- |
| (1,7) | (2,7) | (3,7) | (4,7) | (5,7) | (6,7) | (7,7) | (8,7) | ---- |
| (1,8) | (2,8) | (3,8) | (4,8) | (5,8) | (6,8) | (7,8) | (8,8) | ---- |

FIG. 16C

| (1,1) | (2,1) | (3,1) | (4,1) | (5,1) | (6,1) | (7,1) | (8,1) | ---- |
|---|---|---|---|---|---|---|---|---|
| (1,2) | (2,2) | (3,2) | (4,2) | (5,2) | (6,2) | (7,2) | (8,2) | ---- |
| (1,3) | (2,3) | (3,3) | (4,3) | (5,3) | (6,3) | (7,3) | (8,3) | ---- |
| (1,4) | (2,4) | (3,4) | (4,4) | (5,4) | (6,4) | (7,4) | (8,4) | ---- |
| (1,5) | (2,5) | (3,5) | (4,5) | (5,5) | (6,5) | (7,5) | (8,5) | ---- |
| (1,6) | (2,6) | (3,6) | (4,6) | (5,6) | (6,6) | (7,6) | (8,6) | ---- |
| (1,7) | (2,7) | (3,7) | (4,7) | (5,7) | (6,7) | (7,7) | (8,7) | ---- |
| (1,8) | (2,8) | (3,8) | (4,8) | (5,8) | (6,8) | (7,8) | (8,8) | ---- |

FIG. 16D

| (1,1) | (2,1) | (3,1) | (4,1) | (5,1) | (6,1) | (7,1) | (8,1) | ---- |
|---|---|---|---|---|---|---|---|---|
| (1,2) | (2,2) | (3,2) | (4,2) | (5,2) | (6,2) | (7,2) | (8,2) | ---- |
| (1,3) | (2,3) | (3,3) | (4,3) | (5,3) | (6,3) | (7,3) | (8,3) | ---- |
| (1,4) | (2,4) | (3,4) | (4,4) | (5,4) | (6,4) | (7,4) | (8,4) | ---- |
| (1,5) | (2,5) | (3,5) | (4,5) | (5,5) | (6,5) | (7,5) | (8,5) | ---- |
| (1,6) | (2,6) | (3,6) | (4,6) | (5,6) | (6,6) | (7,6) | (8,6) | ---- |
| (1,7) | (2,7) | (3,7) | (4,7) | (5,7) | (6,7) | (7,7) | (8,7) | ---- |
| (1,8) | (2,8) | (3,8) | (4,8) | (5,8) | (6,8) | (7,8) | (8,8) | ---- |

FIG. 21

| (1,1) | (2,1) | (3,1) | (4,1) | (5,1) | (6,1) | (7,1) | (8,1) |
|---|---|---|---|---|---|---|---|
| (1,2) | (2,2) | (3,2) | (4,2) | (5,2) | (6,2) | (7,2) | (8,2) |
| (1,3) | (2,3) | (3,3) | (4,3) | (5,3) | (6,3) | (7,3) | (8,3) |
| (1,4) | (2,4) | (3,4) | (4,4) | (5,4) | (6,4) | (7,4) | (8,4) |
| (1,5) | (2,5) | (3,5) | (4,5) | (5,5) | (6,5) | (7,5) | (8,5) |
| (1,6) | (2,6) | (3,6) | (4,6) | (5,6) | (6,6) | (7,6) | (8,6) |
| (1,7) | (2,7) | (3,7) | (4,7) | (5,7) | (6,7) | (7,7) | (8,7) |
| (1,8) | (2,8) | (3,8) | (4,8) | (5,8) | (6,8) | (7,8) | (8,8) |

SOLID-STATE IMAGE PICKUP APPARATUS FOR READING PIXEL SIGNALS OUT AT A HIGH FRAME RATE

BACKGROUND OF THE INVENTION

The present invention relates to solid-state image pickup apparatus including a pixel section consisting of a large number of pixels, in which pixel signals corresponding to a full angle of view (field) can be read out at high frame rates.

Conventional XY addressing type solid-state image pickup apparatus are generally constructed as shown in FIG. 1. The solid-state image pickup apparatus shown in FIG. 1 includes: a horizontal scanning circuit 100; a signal readout section 102 having "m" units of NMOS transistors 101 connected in X-direction; a vertical scanning unit 103; and a pixel section 105 having pixels 104 arrayed in a matrix of "m" units in X-direction and "n" units in y-direction.

Vertical select lines G(1), G(2), G(3), G(4), G(5), G(6), . . . G(n−1), G(n) connected to the respective pixel rows each consisting of pixels 104 arrayed in X-direction are connected to a vertical scanning circuit 103 having a function for selectively supplying electric potentials to read out the signal. Horizontal select lines S(1), S(2), S(3), S(4), S(5), S(6), S(m−1), S(m) connected to the respective pixel columns each consisting of pixels 104 arrayed in Y-direction are connected to the signal readout section 102 for selectively reading the signal out of pixels 104. While the respective gates of the NMOS transistors 101 of the signal readout section 102 are controlled by output pulses ΦH(1), ΦH(2), ΦH(3), ΦH(4), ΦH(5), ΦH(6), . . . ΦH(m−1), ΦH(m) of a horizontal scanning circuit 100, the sources thereof are respectively connected to the horizontal select lines S(1), S(2), S(3), S(4), S(5), S(6), . . . S(m−1), S(m) and the drains thereof are commonly connected to an output terminal SIG.

Referring to a timing chart of FIG. 2, the operation will now be explained of the solid-state image pickup apparatus as shown in FIG. 1. FIG. 2 is the timing chart for illustrating operation of the horizontal scanning circuit 100 and readout operation of the signal of pixels 104 when the vertical select line G(1) is selected. Upon inputting of start pulse HST and clock-pulse HCK to the horizontal scanning circuit 100, output pulses ΦH(1), ΦH(2), ΦH(3) , ΦH(4), ΦH(5), ΦH(6), . . . ΦH(m−1), ΦH(m) which are driven to H-level for a duration of one period [time T(sec)] of the clock pulse HCK are sequentially outputted from the horizontal scanning circuit 100 in synchronization with the rising edge of the clock pulse HCK.

Since the NMOS transistors 101 included in the signal readout section 102 are turned on only for a time period during which H-level is being inputted to their respective gate, the NMOS transistor 101 corresponding to the respective output pulse is turned on only for the time period during which output pulse ΦH(1), ΦH(2), ΦH(3), ΦH(4), ΦH(5), ΦH(6), . . . ΦH(m−1), ΦH(m) of the horizontal scanning circuit 100 is driven to H-level. Accordingly, only for the time periods during which output pulses ΦH(1), ΦH(2), ΦH(3), ΦH(4), ΦH(5), ΦH(6), . . . ΦH(m−1), ΦH(m) of the horizontal scanning circuit 100 are driven to H-level, the corresponding horizontal select lines S(1), S(2), S(3), S(4), S(5), S(6), . . . S(m−1), S(m) are selected to read the signal out of pixels 104. It should be noted that SIG in FIG. 2 represents the pixel signal read out to the output terminal SIG as shown in FIG. 1, and (1,1), (2,1), (3,1), (4,1), (5,1), (6,1), . . . (m−1,1), (m,1) correspond to the array of pixels of the pixel section 105 in FIG. 1.

In the conventional solid-state image pickup apparatus as shown in FIG. 1, if the number of pixels 104 included in the pixel section 105 is increased, the signal readout time corresponding to one frame, i.e., frame rate is prolonged nearly in proportion to the number of the arrayed pixels unless the signal readout time per unit pixel is reduced. For example, if signal readout of a solid-state image pickup apparatus having 2,000 pixels in both horizontal and vertical directions is to be performed at the same signal readout time per unit pixel as a solid-state image pickup apparatus having 640 pixels horizontally, 480 pixels vertically and a frame rate of 1/60 sec., its frame rate is (1/60)×(2,000×2,000)/(640×480)=0.22 sec. Such frame rate necessitates an exceedingly long time in adjusting the angle of view and focal point of the taking lens even when the above described solid-state image pickup apparatus is used as an image input apparatus of a still camera system for taking still images. An inconvenience is caused when manipulating the system.

SUMMARY OF THE INVENTION

In view of the above problems of the conventional solid-state image pickup apparatus, it is a main object of the present invention to provide a high-definition solid-state image pickup apparatus capable of performing readout of the pixel signals corresponding to a full angle of view at a rapid frame rate even when the number of pixels is very large.

In accordance with the present invention, there is provided a solid-state image pickup apparatus including a pixel section having a plurality of pixels arrayed in both or one of horizontal and vertical directions and a scanning circuit for scanning the pixel section, the scanning circuit comprises a scanning section having a plurality of scanning circuit units each consisting of a shift register unit and a signal select unit having a plurality of output terminals, and a scan control section for generating scan control signal for controlling the signal select unit. Output signal of the shift register unit is selectively outputted to the plurality of output terminals of the signal select unit controlled by the scan control signal to form scanning signal of the scanning circuit.

In this manner, output signal of the shift register unit is selectively outputted to the plurality of output terminals of the signal select unit controlled by the scan control signal to form scanning signal. It is thereby possible to perform at a rapid frame rate readout of pixel signals corresponding to a full angle of view even when a high-definition solid-state image pickup apparatus having a very large number of pixels is used. The above main object is thereby achieved.

In one aspect of the invention, the signal select unit includes a plurality of 2-input NOR circuits each having one input terminal to which scan control signal is inputted and the other input terminal connected in common to which output signal of the shift register unit is applied. Scanning signal is provided from the respective output terminal of the plurality of 2-input NOR circuits. In another aspect, the signal select unit includes a plurality of 2-input NAND circuits each having one input terminal to which scan control signal is inputted and the other input terminal connected in common to which output signal of the shift register unit is applied. Scanning signal is provided from the respective output terminal of the 2-input NAND circuits. In yet another aspect, the signal select unit includes a plurality of scanning signal transmitting switches one end of each connected in common to the output terminal of the shift register unit and controlled by scan control signal, a non-select level line for supplying non-select level of the scanning signal, and a plurality of non-select switches disposed between the other end of the scan signal transmitting switches and the non-select level line and controlled by an inverted signal of the scan control signal. Scanning signal is provided from the other end of each scanning signal transmitting switch. By constructing the signal select unit in the manner as described above, it is possible to readily form scanning signal capable of performing at high frame rates readout of pixel signals corresponding to a full angle of view in various modes conforming to the scan control signal outputted from the scan control section.

It is another object of the present invention to provide a solid-state image pickup apparatus capable of performing at high frame rates readout of pixel signals corresponding to a full angle of view by scanning through thinned out pixel signals.

In accordance with the present invention, the scan control section provides scan control signal for causing the output of the shift register unit to be selectively outputted as scanning signal to one terminal of the plurality of output terminals of the signal select unit in a time period during which a select level is being outputted. In another aspect of the invention, the scan control section provides scan control signal for causing the output of the shift register unit to be outputted as scanning signal to a plurality of inconsecutive terminals of the plurality of output terminals of the signal select unit at different timings from one another in a time period during which a select level is being outputted. The above object is thereby achieved.

It is a further object of the present invention to provide a solid-state image pickup apparatus capable of performing at high frame rates readout of pixel signals corresponding to a full angle of view while inhibiting a weakening of signal level and at the same time suppressing spurious signals.

In accordance with the present invention, the scan control section provides scan control signal for causing the output of the shift register unit to be outputted as scanning signal concurrently to all the terminals of the plurality of output terminals of the signal select unit in a time period during which a select level is being outputted. In accordance with another aspect of the present invention, the scan control section provides scan control signal for causing the output of the shift register unit to be outputted as scanning signal concurrently to a plurality of consecutive terminals of the plurality of the output terminals of the signal select unit in a time period during which a select level is being outputted. In this manner, pixel signals are scanned as they are added to one another and readout at high frame rates of pixel signals corresponding to a full angle of view is possible, by causing all the terminals of the plurality of output terminals of the signal select unit to concurrently output scanning signal by means of scan control signal provided from the scan control section, or by causing a plurality of consecutive terminals of the plurality of output terminals of the signal select unit to concurrently output scanning signal by means of scan control signal provided from the scan control section. At even higher frame rates, a weakening in signal level is inhibited and spurious signals can be suppressed by increasing the virtual aperture of pixels, thus achieving the above object.

A still further object of the present invention is to provide a solid-state image pickup apparatus in which signal select units of the same construction can be used to sequentially read out all pixel signals in a similar manner as the conventional apparatus, in addition to readout at high frame rates of pixel signals corresponding to a full angle of view.

In accordance with the present invention, the scan control section is constructed to provide scan control signal for causing the output of the shift register unit to be outputted as sequential scanning signal to the plurality of the output terminals of the signal select unit in a period during which a select level is being outputted. The above object is achieved such that, with signal select units of the same construction, not only readout at high frame rates of pixel signals corresponding to a full angle of view but also sequential readout of all pixel signals similar to that in the conventional solid-state image pickup apparatus is possible, by means of construction where the plurality of output terminals of the signal select unit are caused to output sequential scanning signal by scan control signal provided from the scan control section.

BRIEF DESCRIPTION OF THE DRAWINGS

FIG. 5 is a timing chart for explaining readout operation based on another form of scan control signal outputted from the scan control section in the first embodiment as shown in FIG. 3.

FIGS. 6A and 6B each illustrates the disposition of a pixel section showing pixels to be read out by readout operation shown in the timing charts of FIGS. 4 and 5, respectively.

FIG. 7 is a timing chart for explaining readout operation based on yet another form of scan control signal outputted from the scan control section in the first embodiment as shown in FIG. 3.

FIG. 8 illustrates the disposition of a pixel section to be read out by readout operation shown in the timing chart of FIG. 7.

FIGS. 16A, 16B, 16C, 16D each illustrates the disposition of a pixel section showing pixels to be read out by readout operation as shown in the timing charts of FIGS. 12 to 15, respectively.

FIG. 21 illustrates the disposition of a pixel section showing the pixels to be read out by readout operation as shown in the timing chart of FIG. 20.

DESCRIPTION OF THE PREFERRED EMBODIMENTS

Embodiment 1

Figure 3:
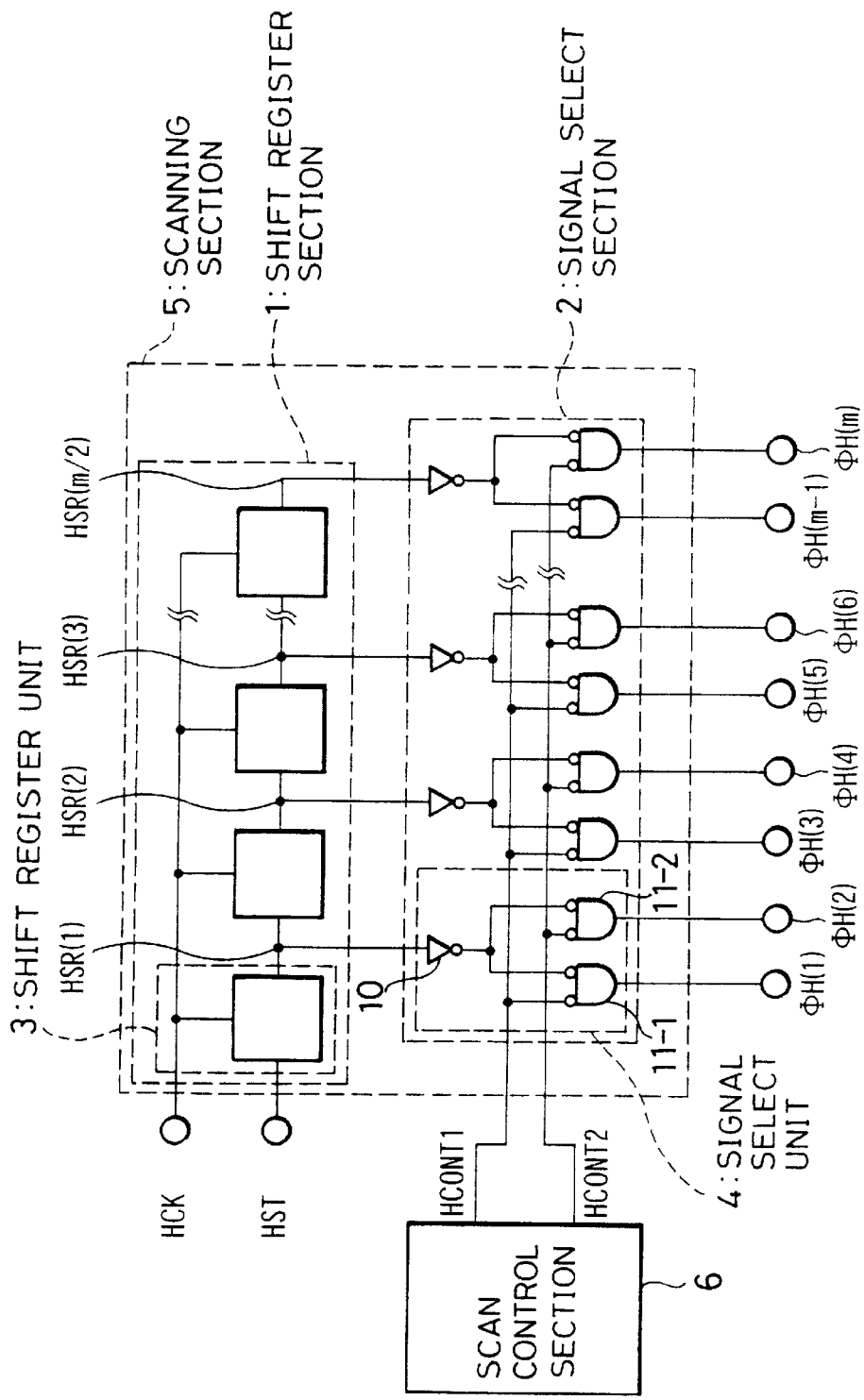
FIG. 3 is a block diagram showing the construction of horizontal scanning circuit of a first embodiment of the solid-state image pickup apparatus according to the present invention.

An embodiment of the present invention will now be described. FIG. 3 is a block diagram showing the construction of horizontal scanning circuit in a first embodiment of the solid-state image pickup apparatus according to the present invention, this embodiment corresponding to the invention as claimed in claims 1 and 2. The horizontal scanning circuit shown in FIG. 3 includes a scanning section 5 and a scan control section 6, the scanning section 5 having a shift register section 1 and a signal select section 2. The shift register section 1 is constructed by cascading "m/2" stages of shift register units 3. Start pulse HST and clock pulse HCK are inputted thereto to generate output signal HSR(1), HSR(2), HSR(3), . . . HSR(m/2) from the respective shift register unit 3.

The signal select section 2 is constructed by arraying "m/2" signal select units 4 corresponding to the above described shift register units 3. The signal select unit 4 includes: an inverter 10 to which output signal HSR(1), HSR(2), HSR(3), . . . HSR(m/2) from the respective shift register unit 3 is inputted; a 2-input NOR circuit 11-1 having one input thereof to which output of the inverter 10 is inputted and the other input thereof to which scan control signal HCONT1 outputted from the scan control section 6 is inputted; and a 2-input NOR circuit 11-2 having one input thereof to which output of the inverter 10 is also inputted and the other input thereof to which scan control signal HCONT2 outputted from the scan control section 6 is inputted. Here, a scanning circuit unit is formed by the shift register unit 3 and signal select unit 4. The respective outputs of the 2-input NOR circuits 11-1, 11-2 of the respective signal select units 4 are to provide scanning signals ΦH(1), ΦH(2), ΦH(3), ΦH(4), ΦH(5), ΦH(6), . . . ΦH(m−1), ΦH(m), respectively.

Figure 1:
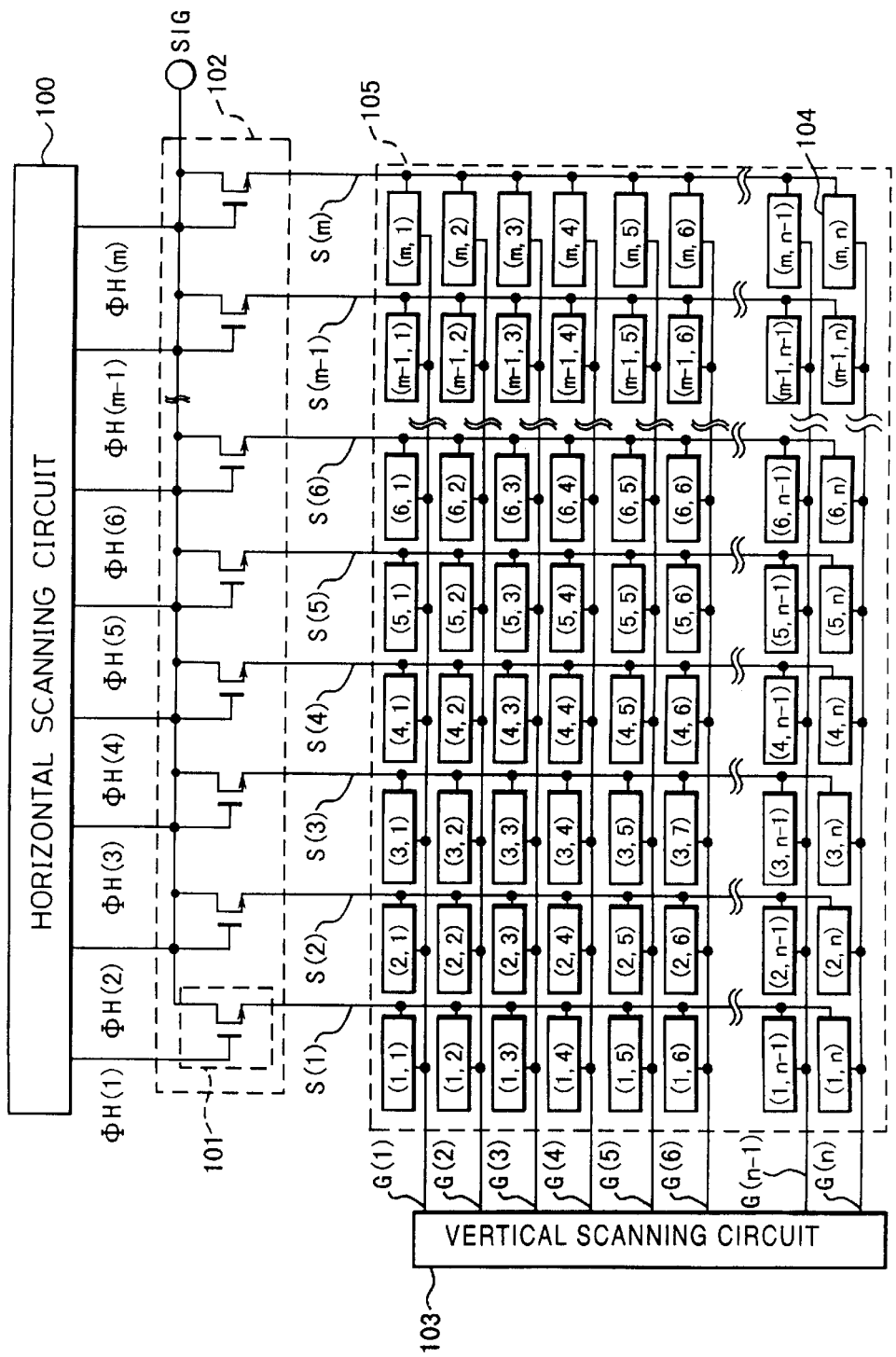
FIG. 1 is a circuit diagram showing an example of construction of conventional solid-state image pickup apparatus.
Figure 2:
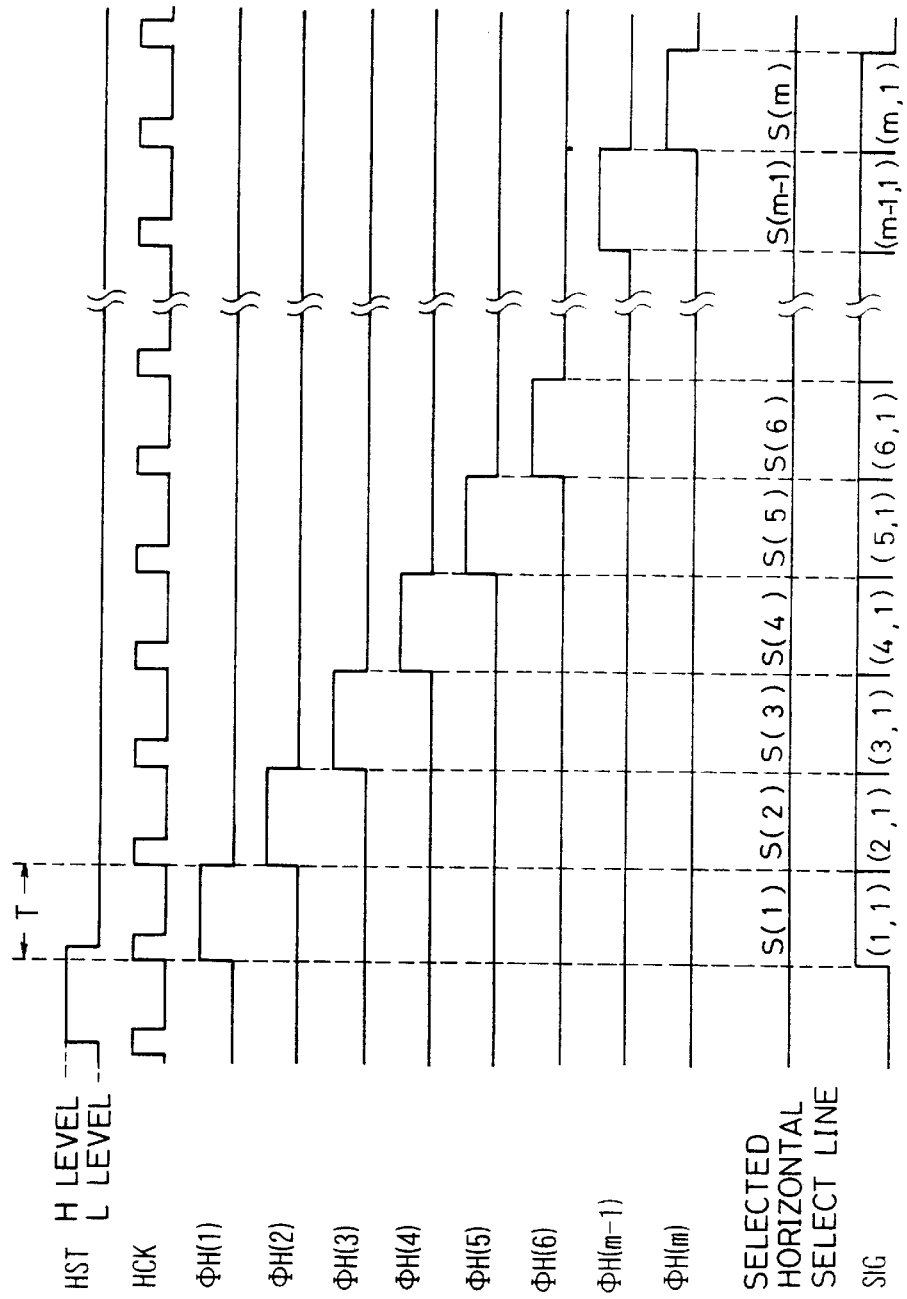
FIG. 2 is a timing chart for explaining operation of the conventional example as shown in FIG. 1.
Figure 4:
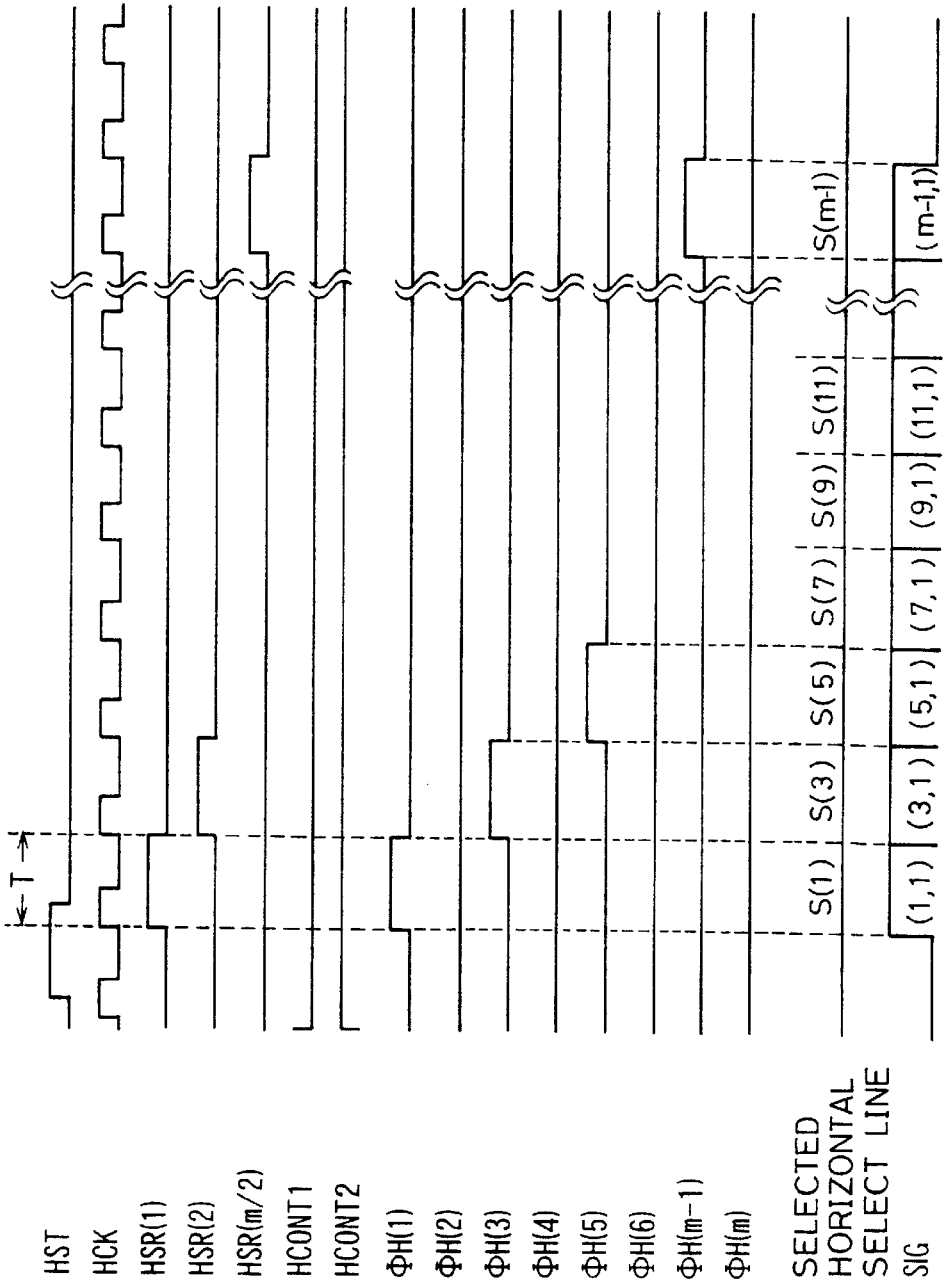
FIG. 4 is a timing chart for explaining readout operation based on scan control signal outputted from the scan control section in the first embodiment as shown in FIG. 3.

A description will now be given with respect to the operation of a case where the horizontal scanning circuit as shown in FIG. 3 is used in place of the horizontal scanning circuit 100 of the conventional solid-state image pickup apparatus as shown in FIG. 1 and a scan control section constructed to provide scan control signal corresponding to the invention as claimed in claim 5 is employed as the scan control section 6 in FIG. 3. FIGS. 4 and 5 are timing charts for indicating operation of the horizontal scanning circuit as shown in FIG. 3 and readout mode of the signal of pixels 104 when the vertical select line G(1) is selected. FIG. 4 is the timing chart of a case where the scan control signals HCONT1 and HCONT2 are driven to L-level and H-level, respectively; and FIG. 5 is the timing chart of a case where the scan control signals HCONT1 and HCONT2 are driven to H-level and L-level, respectively.

Referring first to FIG. 4, a description is given below of the case of operation where the control signals HCONT1, HCONT2 are driven to L-level, H-level, respectively. Upon inputting of start pulse HST and clock pulse HCK having a period of T(sec) to the shift register section 1, output pulses HSR(1), HSR(2), HSR(3), . . . HSR(m/2) driven to H-level for time duration of one period of clock pulse HCK are sequentially outputted from the shift register section 1 in synchronization with the rising edge of the clock pulse HCK. Since control signal HCONT1 (L-level) is inputted to the one input terminal of the 2-input NOR circuit 11-1 of the signal select unit 4 and since control signal HCONT2 (H-level) is inputted to the one input terminal of the 2-input NOR circuit 11-2 of the same, the outputs ΦH(1), ΦH(3), ΦH(5), . . . ΦH(m−1) of the 2-input NOR circuit 11-1 are driven to H-level for time period during which the output pulses HSR(1), HSR(2), HSR(3), . . . HSR(m/2) of the respective shift register unit 3 are being at H-level, and the outputs ΦH(2), ΦH(4), ΦH(6), . . . ΦH(m) of the 2-input NOR circuit 11-2 are continuously driven to L-level.

Accordingly, in the time period during which the outputs pulses ΦH(1), ΦH(3), ΦH(5), . . . ΦH(m−1) are at H-level, the corresponding horizontal select lines S(1), S(3), S(5), . . . S(m−1) are selected to read the signal out of pixels 104. Since, in other words, signals are read out of the alternate ones of pixels, the time required for readout of a pixel group corresponding to one row is (m/2) ×T(sec).

Referring next to FIG. 5, a description is given below of the case of operation where the control signals HCONT1, HCONT2 are driven to H-level, L-level, respectively. Upon inputting of start pulse HST and clock pulse HCK having a period of T(sec) to the shift register section 1, output pulses HSR(1), HSR(2), HSR(3), . . . HSR(m/2) similar to the case as shown in FIG. 4 are sequentially outputted from the shift register section 1. Since control signal HCONT1 (H-level) is inputted to the one input terminal of the 2-input NOR circuit 11-1 of the signal select unit 4 and since control signal HCONT2 (L-level) is inputted to the one input terminal of the 2-input NOR circuit 11-2 of the same, the outputs ΦH(1), ΦH(3), ΦH(5), . . . ΦH(m−1) of the 2-input NOR circuit 11-1 are continuously driven to L-level, and the outputs ΦH(2), ΦH(4), ΦH(6), . . . ΦH(m) of the 2-input NOR circuit 11-2 are driven to H-level for time period during which the output pulses HSR(1), HSR(2), HSR(3), . . . HSR(m/2) of the respective shift register unit are being at H-level.

Accordingly, in the time period during which the outputs pulses ΦH(2), ΦH(4), ΦH(6), . . . ΦH(m) are at H-level, the corresponding horizontal select lines S(2), S(4), S(6), . . . S(m) are selected to read the signal out of pixels 104. Since, in other words, signals are read out of the alternate ones of pixels, the time required for the readout of a pixel group corresponding to one row is (m/2) ×T(sec).

FIG. 6A illustrates the disposition of pixel section where signal readout is executed of the case of operation based on the timing chart as shown in FIG. 4, and FIG. 6B illustrates the disposition of pixel section where signal readout is executed of the case of operation based on the timing chart as shown in FIG. 5. Referring to FIGS. 6A and 6B, the portions of hatching represent the pixels of which readout is executed, indicating that, in FIG. 6A, pixels of odd-number position in X-direction (1,1), (3,1), (5,1), . . . (m–1,1) are to be read out and that, in FIG. 6B, pixels of even-number position in X-direction (2,1), (4,1), (6,1), . . . (m,1) are to be read out.

Referring next to the timing chart in FIG. 7, a description is given below of the operation of a case where the horizontal scanning circuit as shown in FIG. 3 is used in place of the horizontal scanning circuit 100 of the conventional solid-state image pickup apparatus as shown in FIG. 1 and a scan control section constructed to provide scan control signal corresponding to the invention as claimed in claim 6 is employed as the scan control section 6 in FIG. 3. In the operation of this case, as shown in FIG. 7, scan control signals HCONT1 and HCONT2 are both driven to L-level. Upon inputting of start pulse HST and clock pulse HCK having a period of T(sec) to the shift register section 1, output pulses HSR(1), HSR(2), HSR(3), . . . HSR(m/2) are sequentially outputted from the shift register section 1. Since control signals HCONT1 and HCONT2 both at L-level are respectively input to the one input terminals of the two 2-input NOR circuits 11-1 and 11-2 included in the signal select unit 4, the outputsΦH(1), ΦH(3), ΦH(5), . . . ΦH(m–1) of the 2-input NOR circuit 11-1 and the outputs ΦH(2), ΦH(4), ΦH(6), . . . ΦH(m) of the 2-input NOR circuit 11-2 are both driven to H-level for the time period during which the output pulses HSR(1), HSR(2), HSR(3), . . . HSR(m/2) of the respective shift register unit 3 are being at H-level.

Accordingly, the outputs pulses: ΦH(1) and ΦH(2) ; ΦH(3) and ΦH(4); ΦH(5) and ΦH(6); . . . ; and ΦH(m–1) and ΦH(m) are concurrently driven to H-level in sequence. The corresponding horizontal select lines: S(1) and S(2); S(3) and S(4); S(5) and S(6); . . . ; and S(m–1) and S(m) are concurrently selected, respectively, so that the respective adjacent two pixels: (1,1) and (2,1); (3,1) and (4,1); (5,1) and (6,1); . . . ; and (m–1,1) and (m,1) are concurrently read out in sequence. In other words, the time required for the readout of a pixel group corresponding to one row is (m/2)×T(sec).

FIG. 8 illustrates the disposition of pixel section where signal readout is executed of the case of operation based on the timing chart shown in FIG. 7. Referring to FIG. 8, the portions of hatching represent the pixels of which readout is executed, and the pixels within each thick-lined rectangle are to be concurrently selected.

Figure 9:
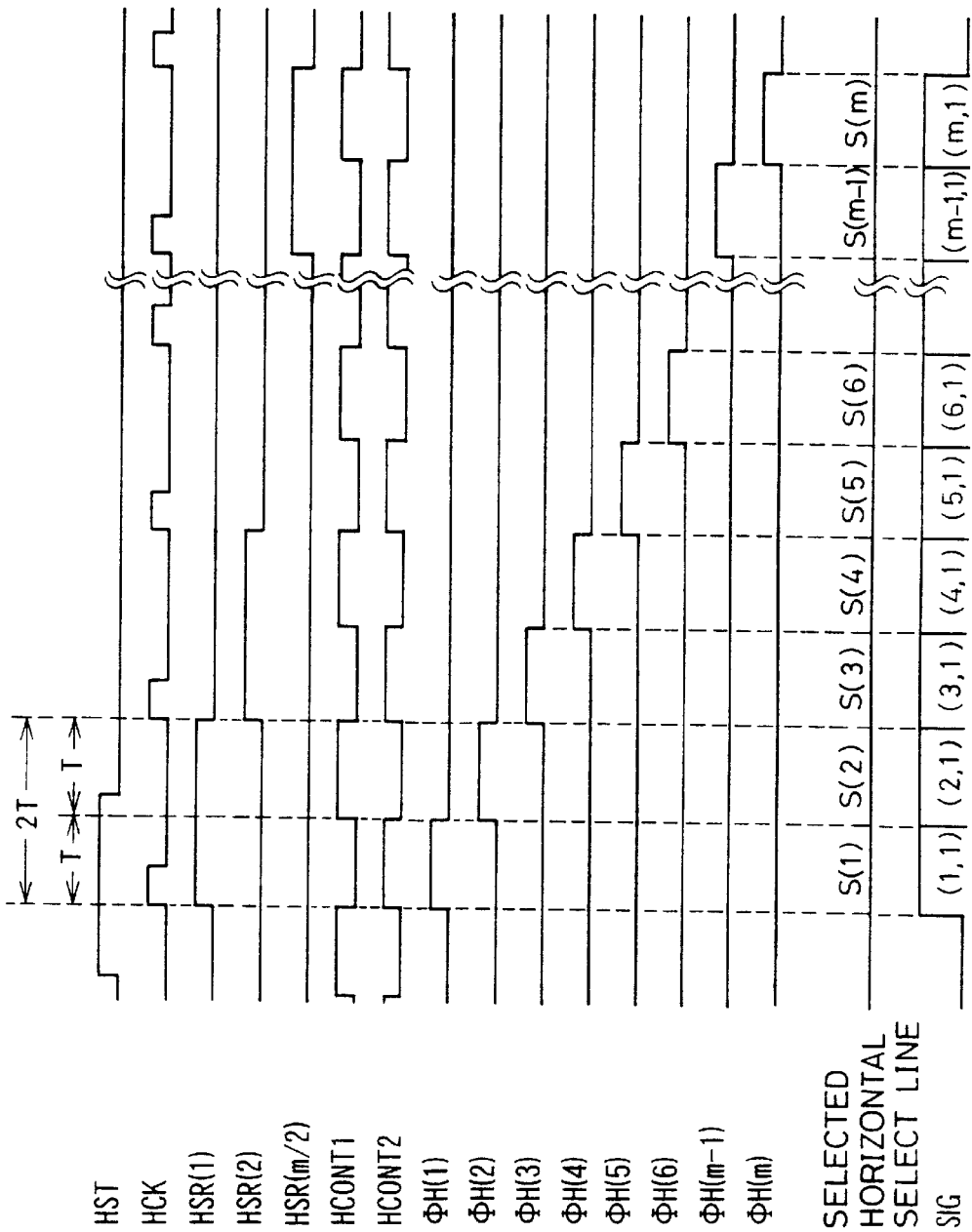
FIG. 9 is a timing chart for explaining readout operation based on yet another form of scan control signal outputted from the scan control section in the first embodiment as shown in FIG. 3.

Referring to a timing chart of FIG. 9, a description is given below of the fact that drive operation similar to that of the conventional example is possible even when the horizontal scanning circuit as shown in FIG. 3 is used in place of the horizontal scanning circuit 100 of the conventional solid-state image pickup apparatus as shown in FIG. 1. Such drive operation is the operation of the case where the scan control section constructed to output scan control signal corresponding to the invention as claimed in claim 7 is employed as the scan control section 6 in FIG. 3. Start pulse HST and clock pulse HCK having a period of 2T(sec) are inputted to the shift register section 1. Output pulses HSR(1), HSR(2), HSR(3), . . . HSR(m/2) to be driven to H-level for time duration of one period of clock pulse HCK are thereby sequentially outputted from the shift register section 1 in synchronization with the rising edge of the clock pulse HCK. The scan control signals HCONT1 and HCONT2 for controlling the signal select section 2 are both provided as a clock pulse having a period of 2T. Here, the control signal HCONT1 is the signal which is driven to L-level for duration T(sec) of the first half of the period (2T) during which the output pulse HSR(1), HSR(2), HSR(3), . . . HSR(m/2) of the shift register section 1 is being at H-level but is driven to H-level for duration T(sec) of the second half thereof. Further, scan control signal HCONT2 is an inverted signal of the scan control signal HCONT1.

Since a 2-input NOR circuit provides H-level only when L-level is inputted to both of the two inputs thereof while provides L-level for all the other cases, the outputs ΦH(1), ΦH(3), ΦH(5), . . . ΦH(m–1) of the 2-input NOR circuit 11-1 to which HCONT1 is inputted are respectively driven to H-level for duration T(sec) of the first half of period (2T) during which the output pulse HSR(1), HSR(2), HSR(3), . . . HSR(m/2) of the shift register section 1 is being at H-level. Similarly, the outputs ΦH(2), ΦH(4), ΦH(6), . . . ΦH(m) of the 2-input NOR circuit 11-2 to which HCONT2 is inputted are respectively driven to H-level for duration T(sec) of the second half of period (2T) during which the output pulse of the shift register 1 is being at H-level. Accordingly, output pulses ΦH(1), ΦH(2), ΦH(3) , . . . ΦH(m) are sequentially outputted and the corresponding horizontal select lines S(1), S(2), S(3), . . . S(m) are sequentially selected to read the signal out of pixels 104. By driving in this manner, drive operation for sequential readout of all pixels similar to that of the conventional solid-state image pickup apparatus becomes possible even when the horizontal scanning circuit as shown in FIG. 3 is used.

As has been described, when the drive methods of the timing charts in FIGS. 4, 5 and 7 are executed by using the horizontal scanning circuit of the construction as shown in FIG. 3, the time required for reading the signal out of pixels corresponding to a full angle of view becomes, in any of the cases, (m/2)×n×T(sec), or one half the time conventionally required. Further, based on the drive method shown in the timing chart of FIG. 9, the method of drive similar to that of the convention solid-state image pickup apparatus is possible even when the horizontal scanning circuit of FIG. 3 is used.

When the solid-state image pickup apparatus according to this embodiment is used as an image input apparatus of a still camera system, pixel signals corresponding to a full angle of view can be read out at a frame rate two times that of the conventional example by effecting the drive operation as shown in the timing chart of FIG. 4, 5 or 7 in adjusting the angle of view and focal point of the taking lens. Further, since the virtual aperture corresponds to two pixels in the drive operation shown in the timing chart of FIG. 7, occurrence of spurious signals can be suppressed. Furthermore, since, in this case, doubling of the signal quantity is possible, it can offset a reduction in the signal quantity resulting from the accumulation time which is shortened to ½ due to the frame rate that is twice the conventional example. Moreover, since, in this embodiment, drive operation similar to that of the conventional solid-state image pickup apparatus is also possible, readout of all pixels can be performed by means of the drive operation as shown in the timing chart of FIG. 9 to obtain a high-definition image, after adjustment of the angle of view and focal point of the taking lens which requires a high-speed drive operation.

Although the signal select unit 4 is constructed by using the inverter 10 and the two 2-input NOR circuit 11-1 and 11-2 in the horizontal scanning circuit of the first embodiment as shown in FIG. 3, those of the construction as shown in FIGS. 10A, 10B, 10C, 10D may also be used as the signal select unit. In particular, the signal select unit 4 shown in FIG. 10A includes: two 2-input NAND circuits 12-1 and 12-2 having one input, respectively, to which scan control signal /HCONT1, /HCONT2 (inverted signal of HCONT1, HCONT2, respectively) is applied, and the other input connected in common, respectively, to which output signal of the shift register unit is applied; and inverters 13-1 and 13-2 connected to the respective outputs of the two 2-input NAND circuits 12-1, 12-2. This construction corresponds to the invention as claimed in claim 3.

Figure 10A:
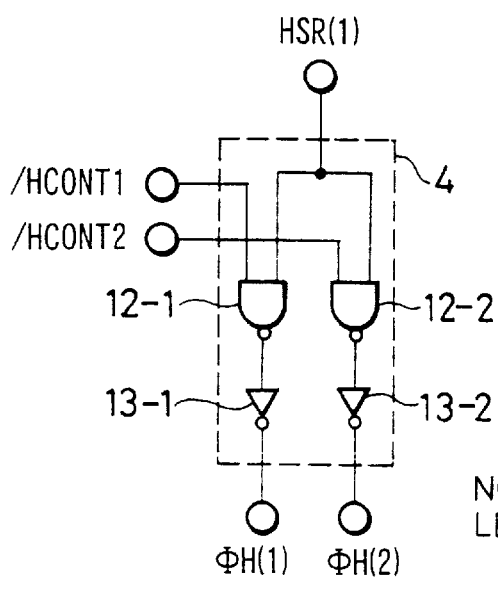
FIGS. 10A, 10B, 10C, 10D are each a circuit diagram showing an example of construction of the signal select unit in the first embodiment as shown in FIG. 3.
Figure 10B:
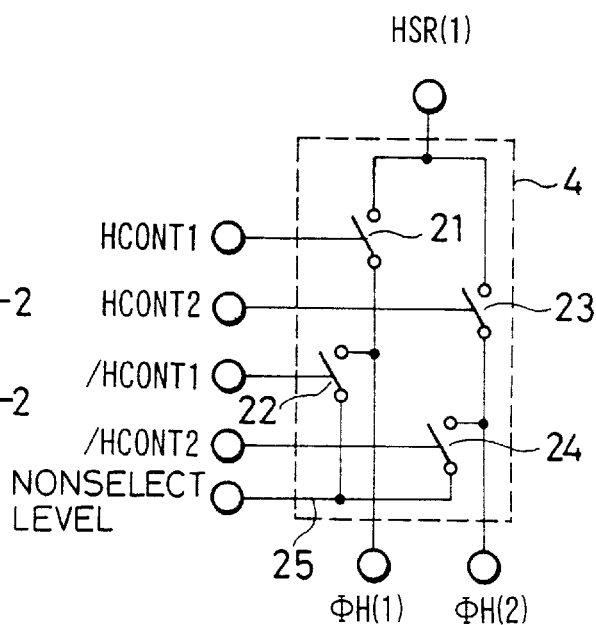

The signal select unit 4 shown in FIG. 10B includes: scanning signal transmitting switches 21 and 23 respectively having one end connected in common to the output terminal of the above described shift register unit and respectively controlled by the scan control signals HCONT1, HCONT2; non-select level line 25 for supplying a non-select level of the scanning signal; and non-select switches 22 and 24 disposed between the respective other ends of the scanning signal transmitting switches 21 and 23 and the non-select level line 25 and respectively controlled by inverted signals /HCONT1, /HCONT2 of the above described scan control signals HCONT1, HCONT2. This construction corresponds to the invention as claimed in claim 4.

Figure 10C:
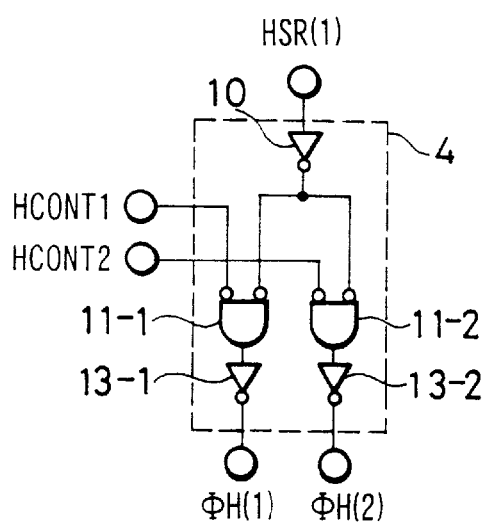

The signal select unit 4 shown in FIG. 10C represents the construction to be used in the case where transistors of PMOS type are used in constructing the signal readout section 102 in the conventional solid-state image pickup apparatus as shown in FIG. 1. It includes: 2-input NOR circuit 11-1 having one input to which scan control signal HCONT1 is applied and the other input to which output signal of the shift register unit is applied via an inverter 10; 2-input NOR circuit 11-2 having one input to which scan control signal HCONT2 is applied and the other input to which output signal of the shift register unit is similarly applied via the above described inverter 10; and inverters 13-1 and 13-2 connected to the respective outputs of the above described two 2-input NOR circuits 11-1, 11-2.

Figure 10D:
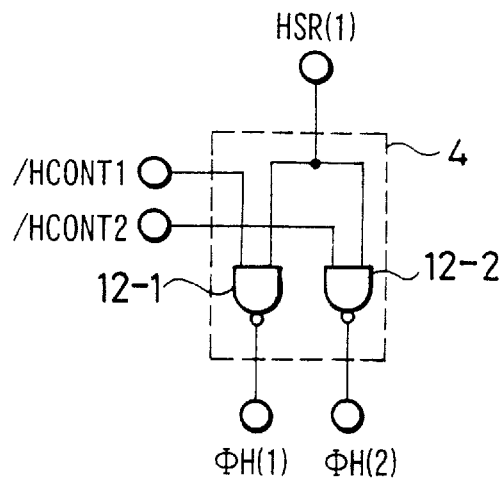

The signal select unit 4 shown in FIG. 10D also represents the construction to be used in the case where transistors of PMOS type are used in constructing the signal readout section 102 in the conventional solid-state image pickup apparatus as shown in FIG. 1. It includes two 2-input NAND circuits 12-1 and 12-2 having one input to which scan control signal /HCONT1, /HCONT2 is applied, respectively, and the other input connected in common to which output signal of the shift register unit is respectively applied. It should be noted that, in the signal select units shown in FIGS. 10A, 10B, 10C, 10D, scan control signals /HCONT1, /HCONT2 represent the inverted signals of the scan control signals HCONT1, HCONT2, respectively.

Embodiment 2

Figure 11:
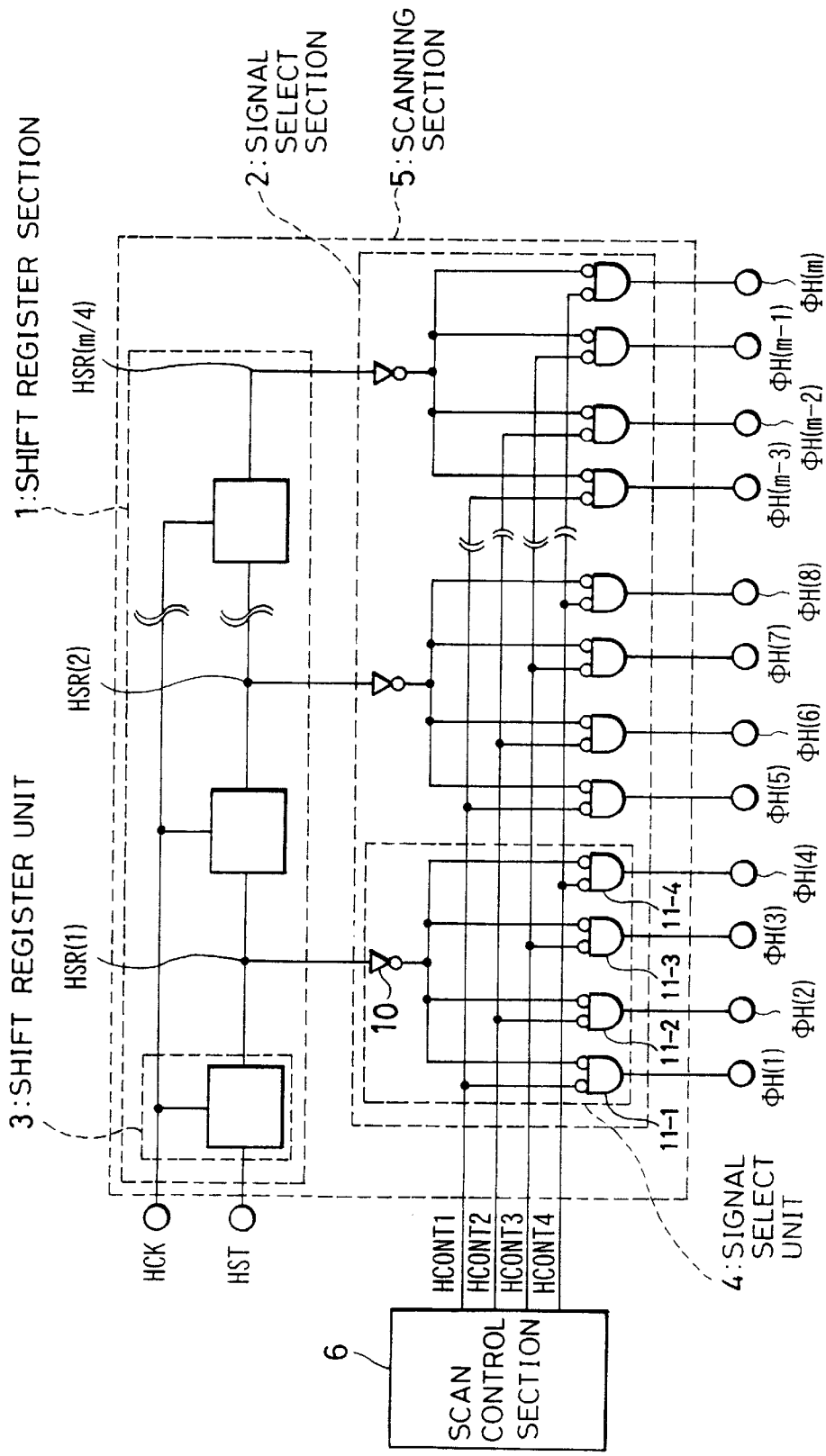
FIG. 11 is a block diagram showing the construction of a horizontal scanning circuit of a second embodiment according to the present invention.

FIG. 11 is a block diagram showing the construction of a horizontal scanning circuit of the solid-state image pickup apparatus according to a second embodiment of the present invention. It differs from the horizontal scanning circuit of the first embodiment as shown in FIG. 3 in that: the number of shift register units 3 included in the shift register section 1 is m/4; four scan control signals HCONT1, HCONT2, HCONT3, HCONT4 are outputted from the scan control section 6; and each signal select unit 4 includes an inverter 10 to which output signal HSR(1), HSR(2), HSR(3), HSR (m/4) of respective shift register unit is inputted, and four 2-input NOR circuits 11-1, 11-2, 11-3, 11-4 respectively having one input to which output of the inverter 10 is inputted and the other input to which control signal HCONT1, HCONT2, HCONT3, HCONT4 is inputted. Here, output pulses (scanning signals) ΦH(1), ΦH(2), ΦH(3), ΦH(4), ΦH(5), ΦH(6), ... ΦH(m−1), ΦH(m) are to be outputted from the respective output terminals of the 2-input NOR circuits 11-1, 11-2, 11-3, 11-4 of the respective signal select units 4.

Figure 12:
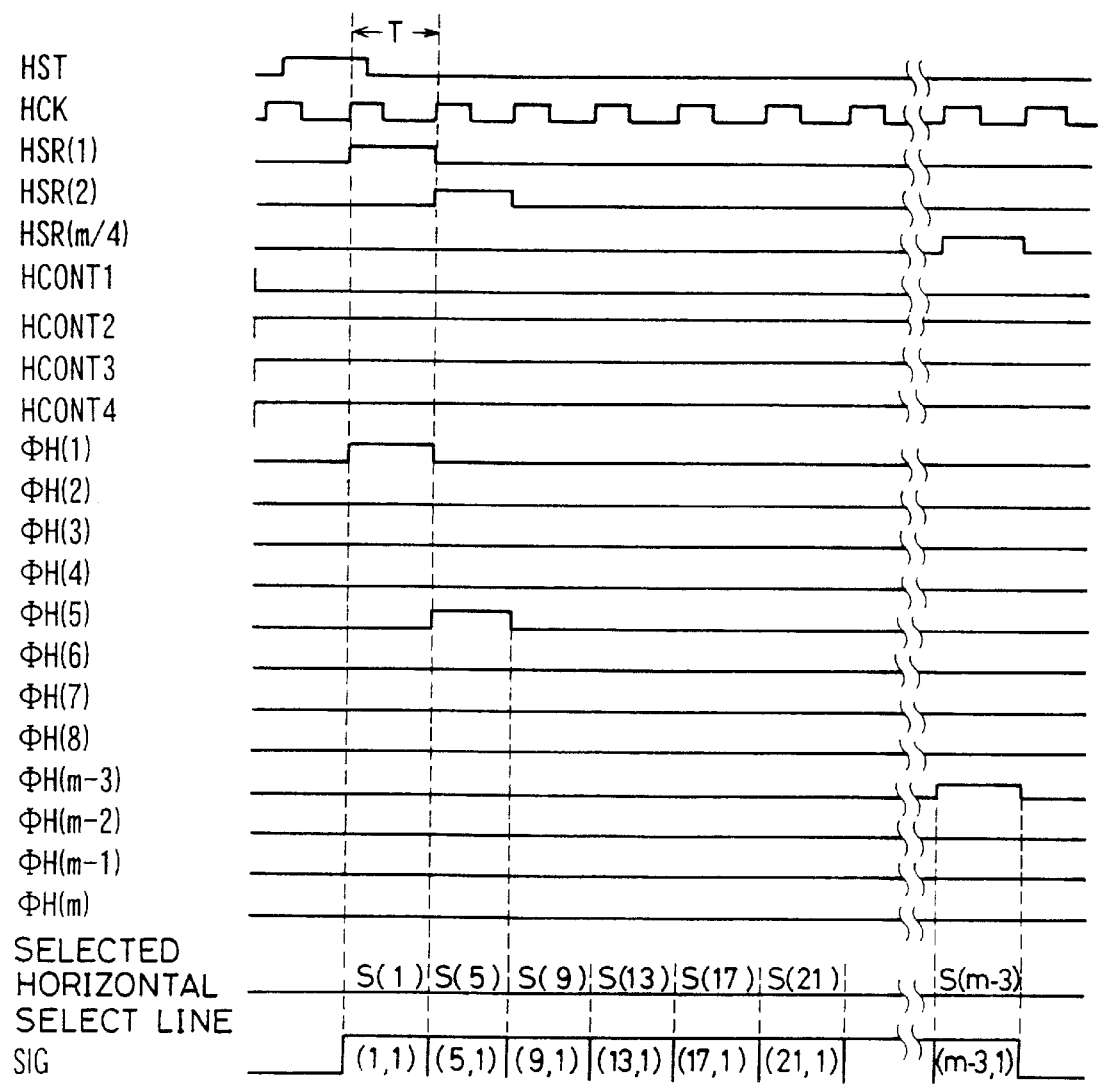
FIG. 12 is a timing chart for explaining readout operation based on scan control signal outputted from the scan control section in the second embodiment as shown in FIG. 11.
Figure 13:
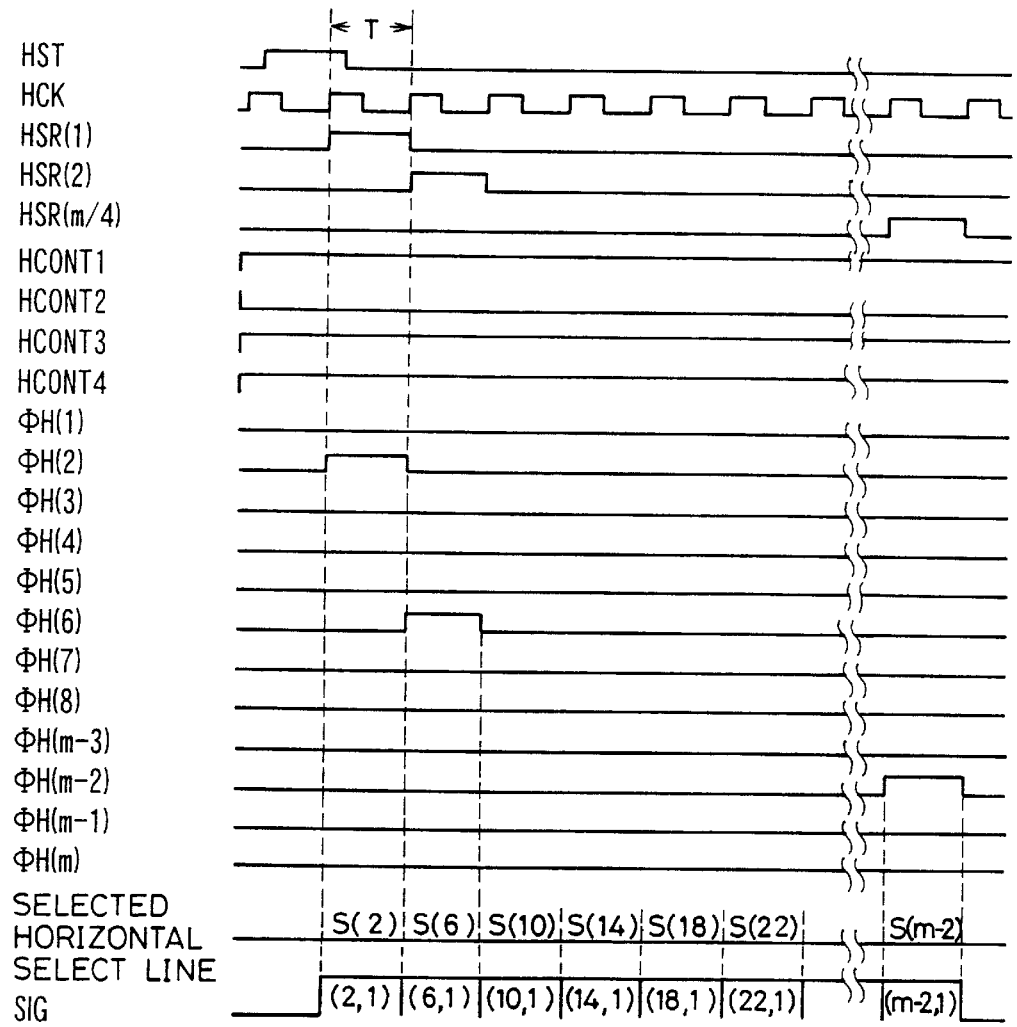
FIG. 13 is a timing chart for explaining readout operation based on another form of scan control signal outputted from the scan control section in the second embodiment as shown in FIG. 11.
Figure 14:
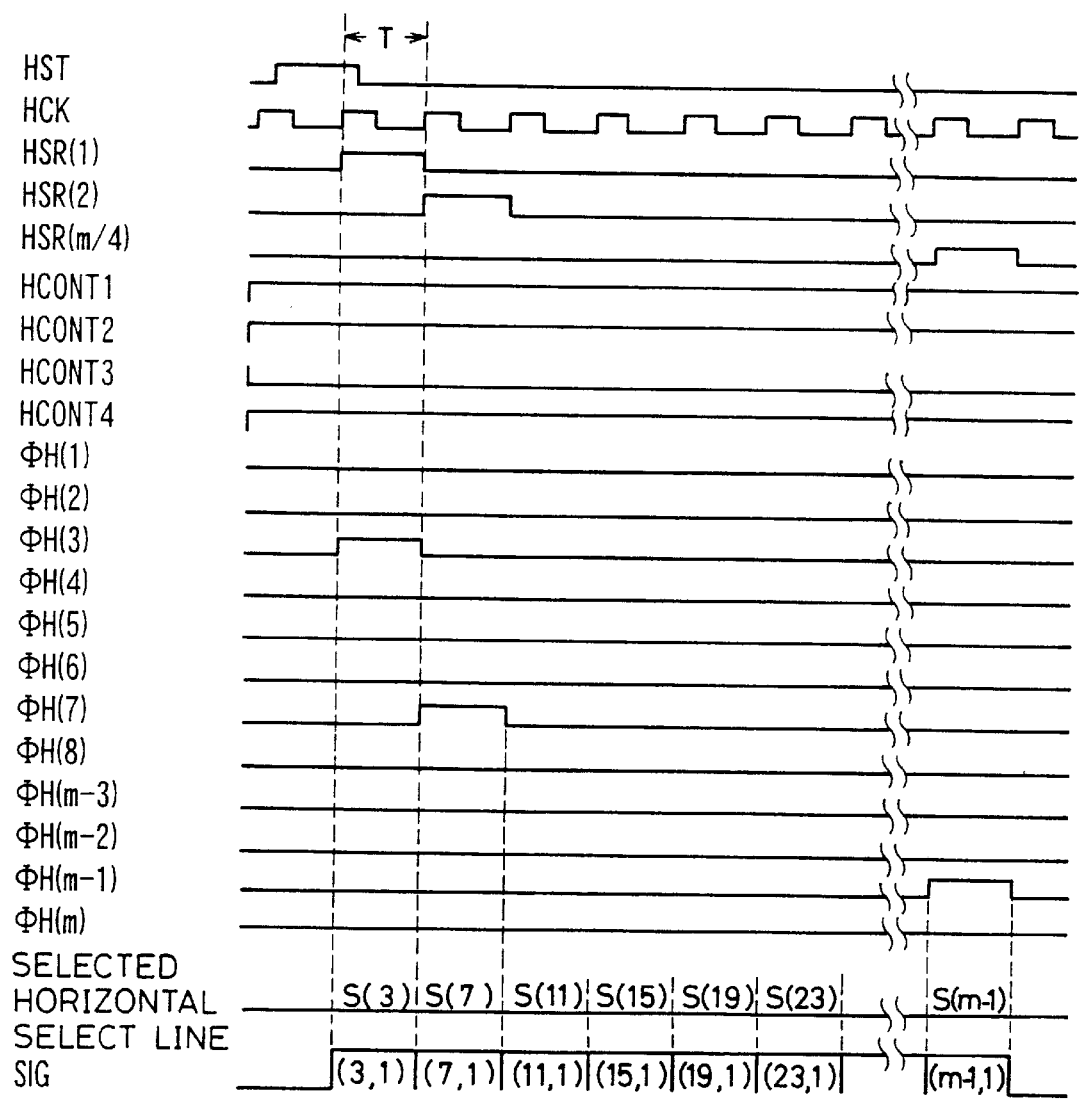
FIG. 14 is a timing chart for explaining readout operation based on yet another form of scan control signal outputted from the scan control section in the second embodiment as shown in FIG. 11.
Figure 15:
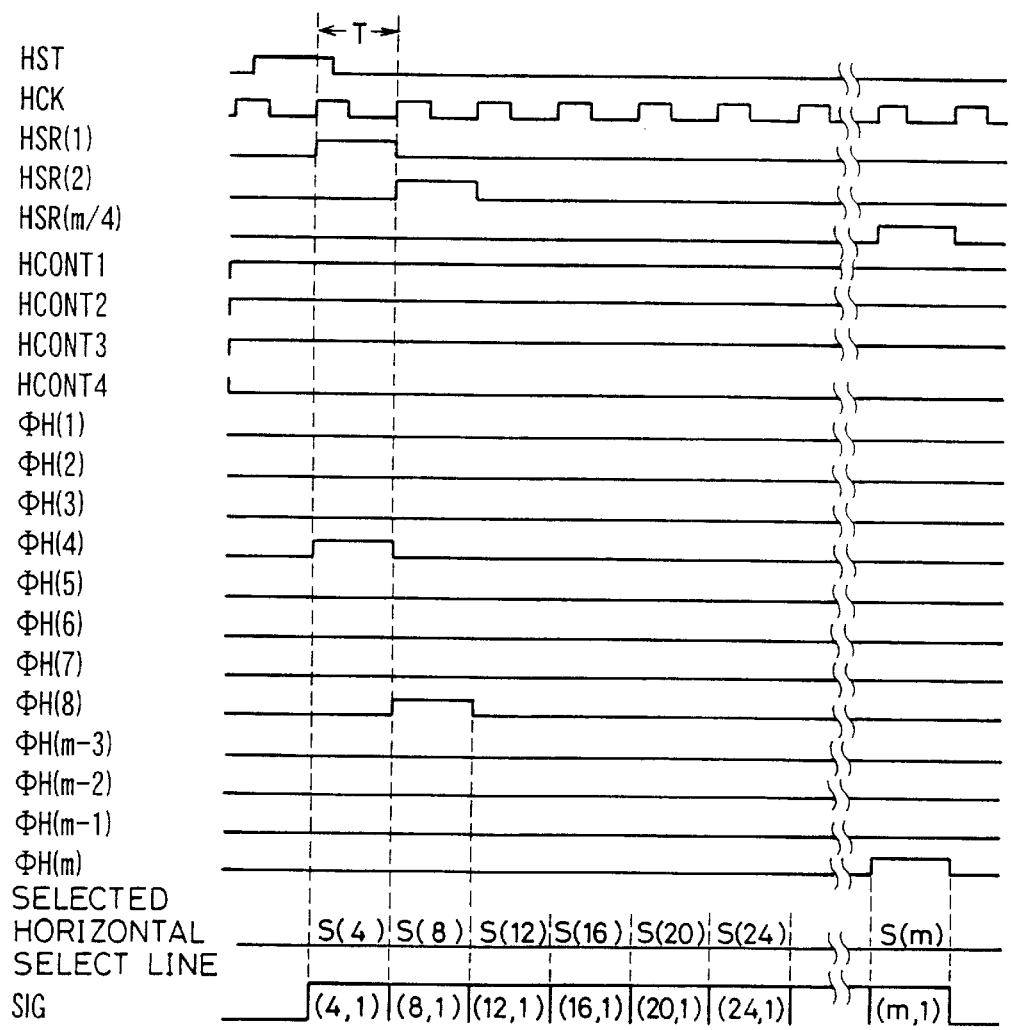
FIG. 15 is a timing chart for explaining readout operation based on yet another form of scan control signal outputted from the scan control section in the second embodiment as shown in FIG. 11.

A description will now be given with respect to the operation of a case where the horizontal scanning circuit as shown in FIG. 11 is used in place of the horizontal scanning circuit 100 of the conventional solid-state image pickup apparatus as shown in FIG. 1 and a scan control section constructed to provide scan control signal corresponding to the invention as claimed in claim 5 is employed as the scan control section 6 in FIG. 11. FIGS. 12 to 15 are timing charts for indicating operation of the horizontal scanning circuit as shown in FIG. 11 and readout operation of the signal of pixels 104 when the vertical select line G(1) is selected. FIG. 12 is the timing chart of a case where the scan control signals HCONT1, HCONT2, HCONT3, HCONT4 are driven to L-level, H-level, H-level, H-level, respectively; and FIG. 13 is the timing chart of a case where the scan control signals HCONT1, HCONT2, HCONT3, HCONT4 are driven to H-level, L-level, H-level, H-level, respectively. Further, FIG. 14 is the timing chart of a case where the scan control signals HCONT1, HCONT2, HCONT3, HCONT4 are driven to H-level, H-level, L-level, H-level, respectively; and FIG. 15 is the timing chart of a case where the scan control signals HCONT1, HCONT2, HCONT3, HCONT4 are driven to H-level, H-level, H-level, L-level, respectively.

Referring first to FIG. 12, a description is given below of the case where the control signals HCONT1, HCONT2, HCONT3, HCONT4 are driven to L-level, H-level, H-level, H-level, respectively. Output pulses HSR(1), HSR(2), HSR (3), ... HSR(m/4) to be driven to H-level for time duration of one period of clock pulse HCK are sequentially outputted from the shift register section 1 in synchronization with the rising edge of clock pulse HCK. Since control signal HCONT1 at L-level is inputted to the one input terminal of the 2-input NOR circuit 11-1 of the signal select unit 4 and since control signals HCONT2, HCONT3, HCONT4 at H-level are inputted to the respective one input terminal of the 2-input NOR circuits, 11-2, 11-3, 11-4 included in the same, the outputs ΦH(1), ΦH(5), ... ΦH(m−3) of the 2-input NOR circuit 11-1 are driven to H-level for the time period during which the output pulse HSR(1), HSR(2), HSR(3), ... HSR(m/4) of the respective shift register unit 3 is being at H-level, and, on the other hand, the outputs of the 2-input NOR circuits 11-2, 11-3, 11-4 but the 2-input NOR circuit 11-1 are continuously driven to L-level. Accordingly, in the time period during which output pulse ΦH(1), ΦH(5), ... H(m−3) is driven to H-level, the corresponding horizontal select line S(1), S(5), S(9), ... S(m−3) is selected to read the signal out of pixels 104. In other words, the time required for readout of a pixel group corresponding to one row is (m/4)×T(sec).

The cases of operation employing drive operation shown in the timing charts of FIGS. 13, 14, 15 are similar to the operation shown in the timing chart of FIG. 12. In particular, driven to H-level for period T(sec) during which the output pulse HSR(1), HSR(2), HSR(3), ... HSR(m/4) of the shift register unit is being at H-level is the output of a NOR circuit inputted to which is a control signal being at L-level among the control signals HCONT1, HCONT2, HCONT3, HCONT4 connected to the NOR circuits 11-1, 11-2, 11-3, 11-4 that are included in the respective signal select unit 4. Selected then is the horizontal select line corresponding to the output of the NOR circuit which is driven to H-level. Specifically, since only the control signal HCONT2 is being at L-level in the operation shown in the timing chart of FIG. 13, horizontal select lines S(2), S(6), S(10), . . . S(m−2) are selected. Further, since only the control signal HCONT3 is being at L-level in the operation shown in the timing chart of FIG. 14, horizontal select lines S(3), S(7), S(11), . . . S(m−1) are selected. Furthermore, since only the control signal HCONT4 is being at L-level in the operation shown in the timing chart of FIG. 15, horizontal select lines S(4), S(8), S(12), . . . S(m) are selected. Since, in any of the cases, the number of readout pixels is ¼ of the number of arrayed pixels, the time required for reading the signal out of a pixel group corresponding one row is (m/4)×T(sec).

FIGS. 16A, 16B, 16C, 16D show the disposition of pixel section to be read out when the signal readout operation is executed of the timing charts of FIGS. 12 to 15, respectively. In FIGS. 16A to 16D, the portions of hatching represent the pixels of which signal readout is executed, indicating the fact that, in any of the cases, the pixel signal of every fourth pixel in the horizontal direction is to be read out.

Figure 17:
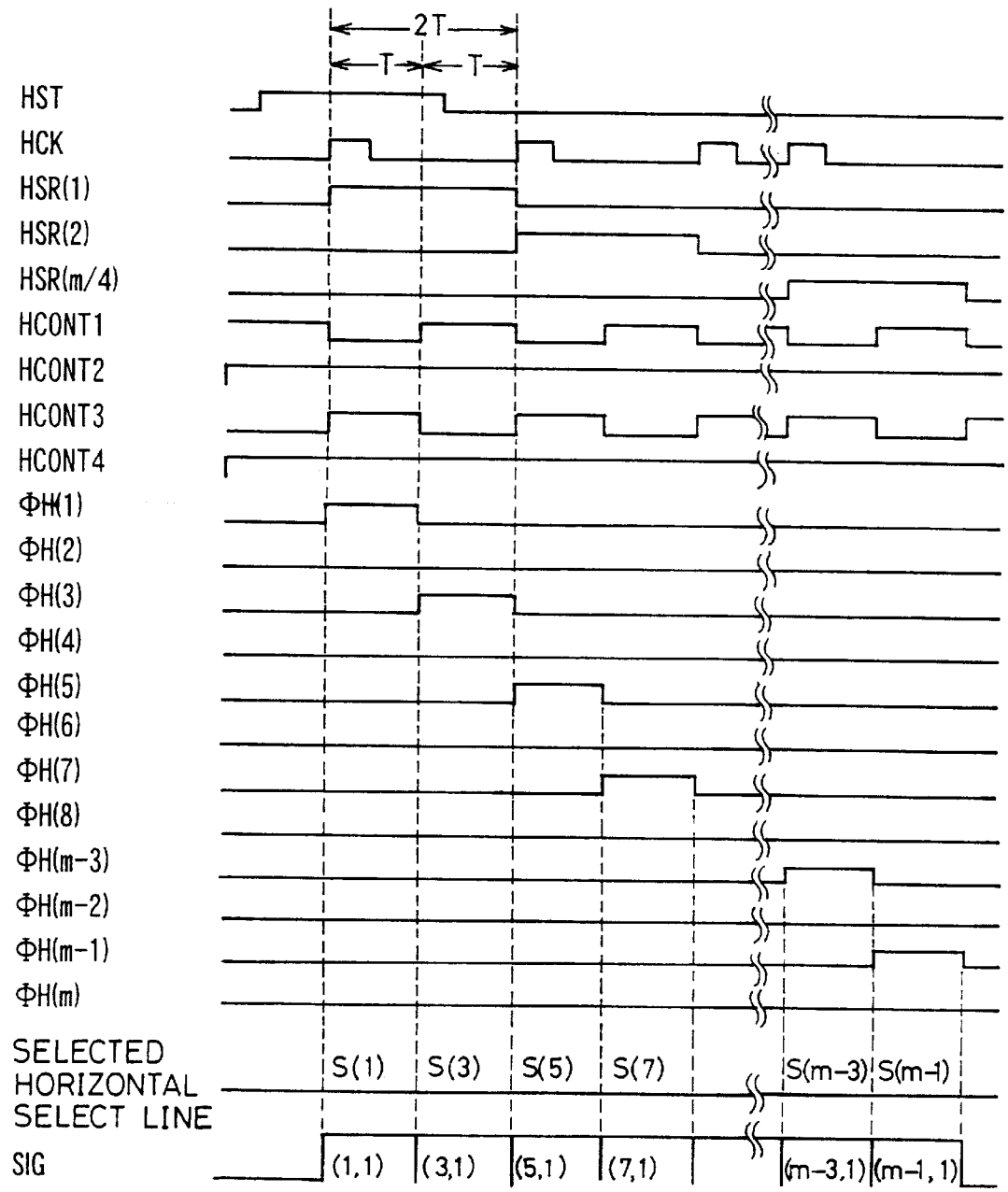
FIG. 17 is a timing chart for explaining readout operation based on yet another form of scan control signal outputted from the scan control section in the second embodiment as shown in FIG. 11.

Referring to the timing charts in FIGS. 17 and 18, a description will now be given with respect to the operation of a case where the horizontal scanning circuit as shown in FIG. 11 is used in place of the horizontal scanning circuit 100 of the conventional solid-state image pickup apparatus as shown in FIG. 1 and a scan control section constructed to provide scan control signal corresponding to the invention as claimed in claim 8 is employed as the scan control section 6 in FIG. 11. Drive operation as shown in the timing chart of FIG. 17 will now be described. Start pulse HST and clock pulse HCK having a period of 2T(sec) are inputted to the shift register section 1. Output pulses HSR(1), HSR(2), HSR(3), . . . HSR(m/4) to be driven to H-level for time duration of one period of clock pulse HCK are thereby sequentially outputted from the shift register section 1 in synchronization with the rising edge of the clock pulse HCK. Referring to FIG. 17, the control signal HCONT1 is driven to L-level for the first half period T(sec) but driven to H-level for the second half period T(sec) of the period (2T) during which the output pulse HSR(1), HSR(2), HSR(3), . . . HSR(m/4) of the shift register section 1 is being at H-level. The scan control signal HCONT3 is an inverted signal of the scan control signal HCONT1. Further, the control signals HCONT2 and HCONT4 are both continuously driven to H-level.

Since a 2-input NOR circuit provides H-level only when L-level is inputted to both of the two inputs thereof while provides L-level for all the other cases, the outputs ΦH(1), ΦH(5), ΦH(9), . . . ΦH(m−3) of the 2-input NOR circuit 11-1 to which control signal HCONT1 is inputted are respectively driven to H-level for duration T(sec) of the first half of period (2T) during which the output pulse HSR(1), HSR(2), HSR(3), HSR(m/4) of the shift register section 1 is being at H-level. Similarly, the outputs ΦH(3), ΦH(7), ΦH(11), . . . ΦH(m−1) of the 2-input NOR circuit 11-3 to which control signal HCONT3 is inputted are respectively driven to H-level for duration T(sec) of the second half of period (2T) during which the output pulse HSR(1), HSR(2), HSR(3), . . . HSR(m/4) of the shift register 1 is being at H-level. Further, the outputs ΦH(2), ΦH(6), ΦH(10), . . . H(m−2) and ΦH(4), ΦH(8), H(12), . . . ΦH(m) of the 2-input NOR circuits 11-2 and 11-4 to which control signals HCONT2 and HCONT4 are inputted, respectively, remain at L-level. Accordingly, output pulses ΦH(1), ΦH(3), ΦH(5), . . . ΦH(m−3), ΦH(m−1) are sequentially outputted from the scanning section 5, and the corresponding horizontal select lines S(1), S(3), S(5), . . . S(m−3), S(m−1) are selected to read the signal out of odd-number pixels (1,1), (3,1), (5,1), . . . (m−3,1) (m−1,1) in the horizontal direction.

A description is given below of drive operation shown in the timing chart of FIG. 18. It differs from the drive operation as shown in the timing chart of FIG. 17 in that there is change with each other between the control signals HCONT1 and HCONT2 and between the control signals HCONT3 and HCONT4. Accordingly, by the signal select unit 4, the output ΦH(2), ΦH(6), ΦH(10), H(m−2) of the 2-input NOR circuit 11-2 to which control signal HCONT2 is inputted and the output ΦH(4), ΦH(8), ΦH(12), . . . ΦH(m) of the 2-input NOR circuit 11-4 to which control signal HCONT4 is inputted are alternately driven to H-level respectively for the first half and second half of the period during which the output pulse HSR(1), HSR(2), HSR(3) , . . . HSR(m/4) of the shift register section 1 is being at H-level. In other words, output pulses ΦH(2), ΦH(4), ΦH(6), . . . ΦH(m−2), ΦH(m) are sequentially outputted from the scanning section 5, and the corresponding horizontal select lines S(2), S(4), S(6), . . . S(m−2), S(m) are selected to read the signal out of even-number pixels (2,1), (4,1), (6,1), . . . (m−2,1), (m,1) in the horizontal direction.

Figure 18:
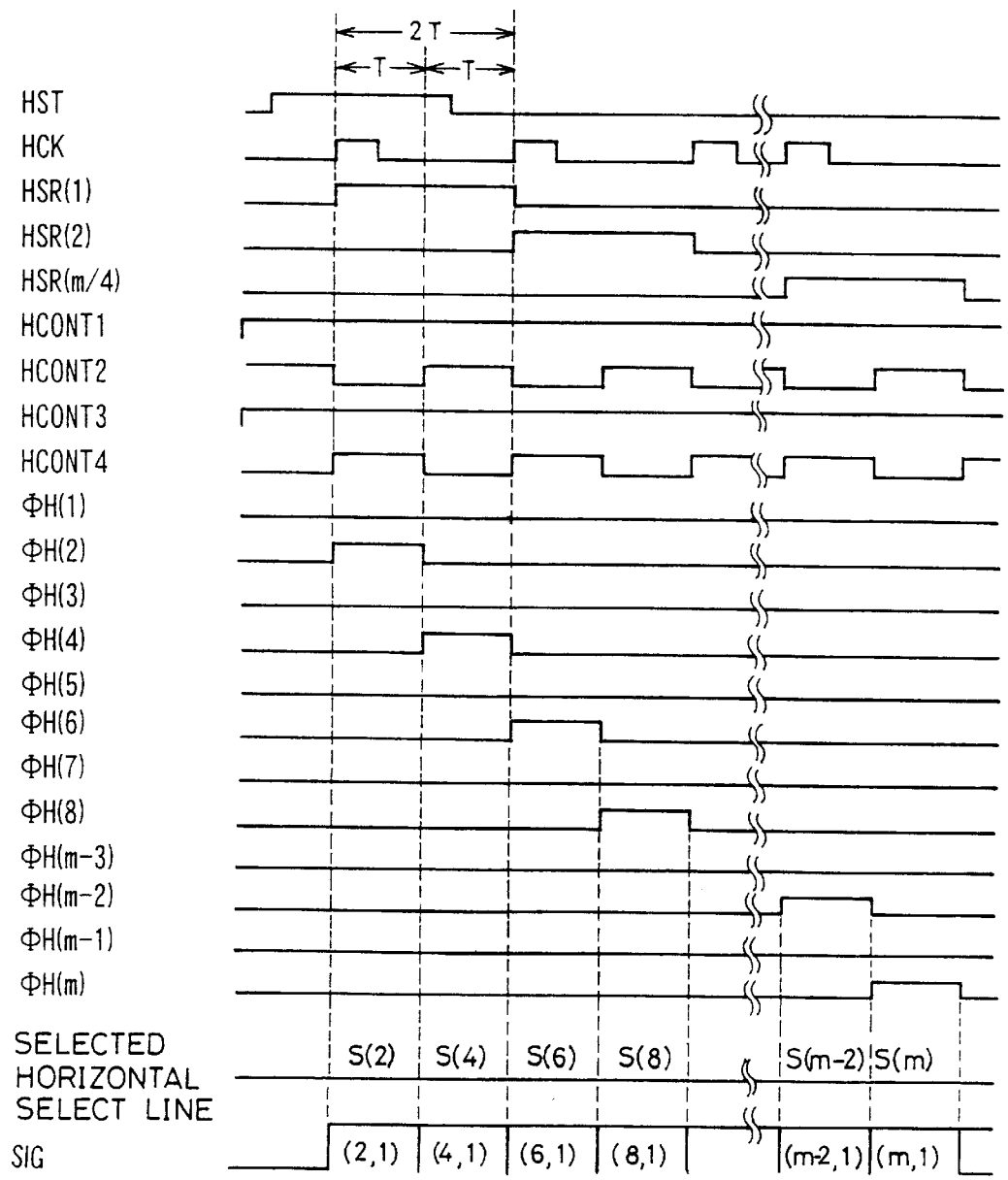
FIG. 18 is a timing chart for explaining readout operation based on yet another form of scan control signal outputted from the scan control section in the second embodiment as shown in FIG. 11.

By driving as shown in the timing charts of FIGS. 17 and 18, since signal is read out of the alternate pixels in a similar manner as the operation shown in the timing charts of FIGS. 4 and 5 in the first embodiment, the time required for readout of a pixel group corresponding to one row is (m/2)×T(sec). It should be noted that the disposition of pixel section of which signal readout is executed by the drive operation as shown in the timing charts of FIGS. 17 and 18 is respectively the same as that in FIGS. 6A, 6B which is illustrated in relation to the first embodiment.

Referring to the timing chart in FIG. 19, a description will now be given with respect to the operation of a case where the horizontal scanning circuit as shown in FIG. 11 is used in place of the horizontal scanning circuit 100 of the conventional solid-state image pickup apparatus as shown in FIG. 1 and a scan control section constructed to provide scan control signal corresponding to the invention as claimed in claim 9 is employed as the scan control section 6 in FIG. 11. Drive operation as shown in the timing chart of FIG. 19 differs from that of FIG. 17 in that control signals HCONT2 and HCONT4 are identical as the control signals HCONT1 and HCONT3, respectively. Accordingly, by the signal select unit 4, the outputs ΦH(1), ΦH(5), ΦH(9) ,. . . ΦH(m−3) of the 2-input NOR circuit 11-1 to which control signal HCONT1 is inputted and the outputs ΦH(2), ΦH(6), ΦH(10), . . . ΦH(m−2) of the 2-input NOR circuit 11-2 to which control signal HCONT2 is inputted are identical and driven to H-level for the first half period T(sec) of period (2T) during which the output pulse HSR(1), HSR(2), HSR (3), . . . HSR(m/4) of the shift register section 1 is being at H-level. Similarly, the outputs ΦH(3), ΦH(7), ΦH(11), . . . H(m−1) of the 2-input NOR circuit 11-3 to which control signal HCONT3 is inputted and the outputs ΦH(4), ΦH(8), ΦH(12), . . . ΦH(m) of the 2-input NOR circuit 11-4 to which control signal HCONT4 is inputted are identical and driven to H-level for the second half period T(sec) of period (2T) during which the output pulse HSR(1), HSR(2), HSR (3), . . . HSR(m/4) of the shift register section 1 is being at H-level.

In other words, output pulses: ΦH(1) and ΦH(2); ΦH(3) and ΦH(4); ΦH(5) and ΦH(6); . . . ΦH(m−3) and ΦH(m−2); and ΦH(m−1) and ΦH(m) are concurrently outputted in sequence, and the corresponding horizontal select lines: S(1) and S(2); S(3) and S(4); S(5) and S(6); . . . S(m−3) and S(m−2); and S(m−1) and S(m) are concurrently selected in sequence. This results in concurrent readout in sequence of pixel signals of consecutive odd-number and even-number in the horizontal direction: (1,1) and (2,1); (3,1) and (4,1); (5,1) and (6,1); . . . (m−3,1) and(m−2,1); and (m−1,1) and (m,1). Accordingly, the time required for reading the signal out of a pixel group of one row is (m/2) ×T(sec). Further, the disposition of pixel section of which signal readout is executed in the case of drive operation shown in the timing chart of FIG. 19 is identical as that shown in FIG. 8 in relation to the first embodiment.

Referring to the timing chart in FIG. 20, a description will now be given with respect to the operation of a case where the horizontal scanning circuit as shown in FIG. 11 is used in place of the horizontal scanning circuit 100 of the conventional solid-state image pickup apparatus as shown in FIG. 1 and a scan control section constructed to provide scan control signal corresponding to the invention as claimed in claim 6 is employed as the scan control section 6 in FIG. 11. In the timing chart of FIG. 20, the logic level of all of the scan control signals HCONT1, HCONT2, HCONT3, HCONT4 is L-level. Start pulse HST and clock pulse HCK having a period of T(sec) are inputted to the shift register section 1. Output pulses HSR(1), HSR(2), HSR(3), . . . HSR(m/4) are thereby sequentially outputted from the shift register section 1. Since L-level control signals HCONT1, HCONT2, HCONT3, HCONT4 are respectively being inputted to the one input terminal of the 2-input NOR circuits 11-1, 11-2, 11-3, 11-4 included in the signal select unit 4, the 2-input NOR circuits 11-1, 11-2, 11-3, 11-4 are driven to H-level for the time period during which output pulse HSR(1), HSR(2), HSR(3), . . . HSR(m/4) of the respective shift register unit is being at H-level. Accordingly, output pulses: ΦH(1) and ΦH(2) and ΦH(3) and ΦH(4); ΦH(5) and ΦH(6) and ΦH(7) and ΦH(8); . . . and ΦH(m−3) and ΦH(m−2) and ΦH(m−1) and ΦH(m) are concurrently driven to H-level, respectively. The corresponding horizontal select lines: S(1) and S(2) and S(3) and S(4); S(5) and S(6) and S(7) and S(8); . . . ; and S(m−3) and S(m−2) and S(m−1) and S(m) are concurrently selected, respectively. This results in concurrent readout in sequence of the signal of pixels: (1,1) and (2,1) and (3,1) and (4,1); (5,1) and (6,1) and (7,1) and (8,1); . . . ; and (m−3,1) and(m−2,1) and (m−1,l) and (m,1). Since, in other words, four pixels are read out at a time, the time required for reading the signal out of a pixel group of one row is (m/4)×T(sec).

Figure 20:
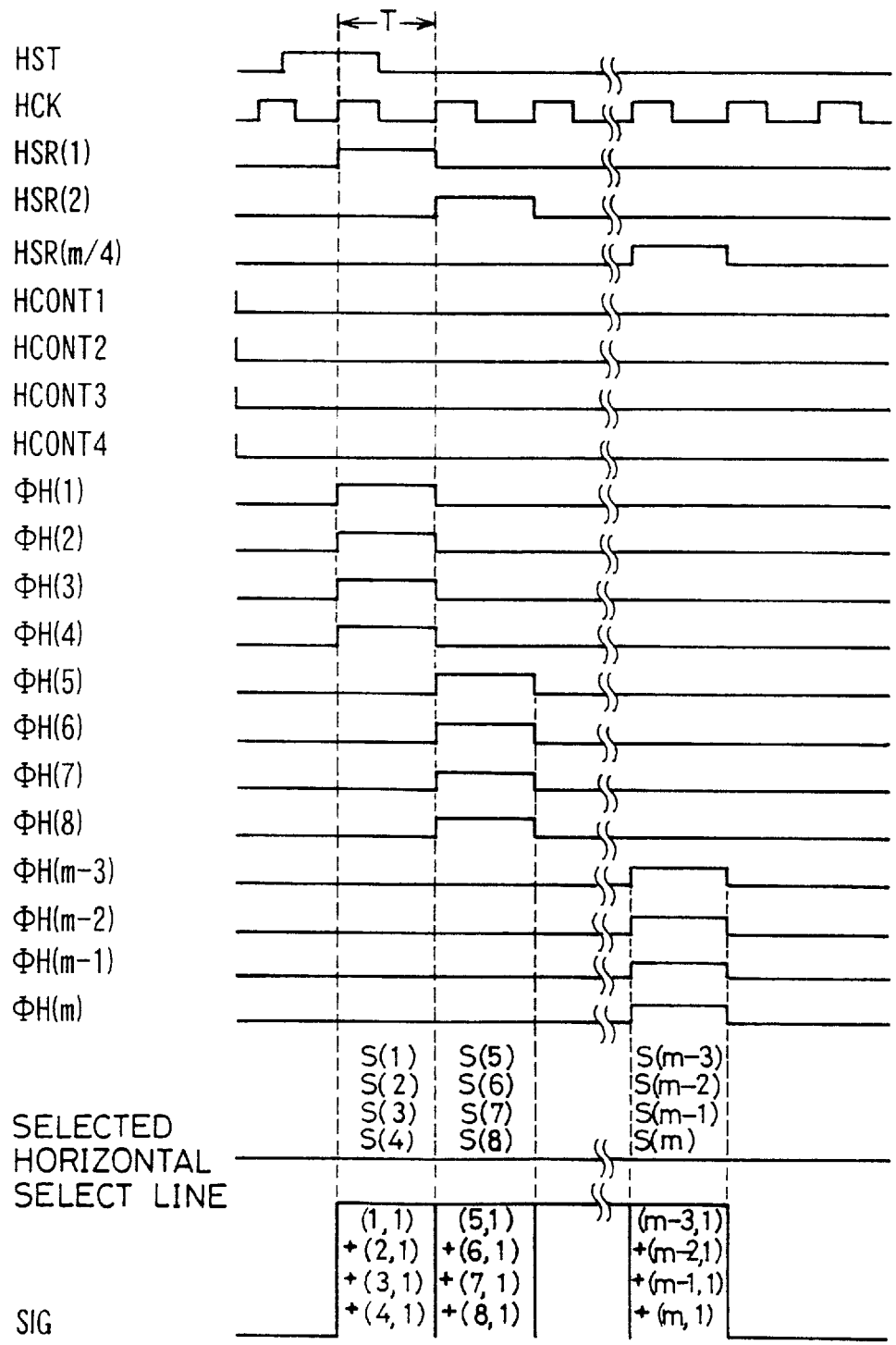
FIG. 20 is a timing chart for explaining readout operation based on yet another form of scan control signal outputted from the scan control section in the second embodiment as shown in FIG. 11.

FIG. 21 shows the disposition of pixel section of which signal readout is executed in the case of operation shown in the timing chart of FIG. 20. Referring to FIG. 21, the portions of hatching represent the pixels of which readout is executed, and the pixels within each thick-lined rectangle are to be concurrently selected.

Figure 22:
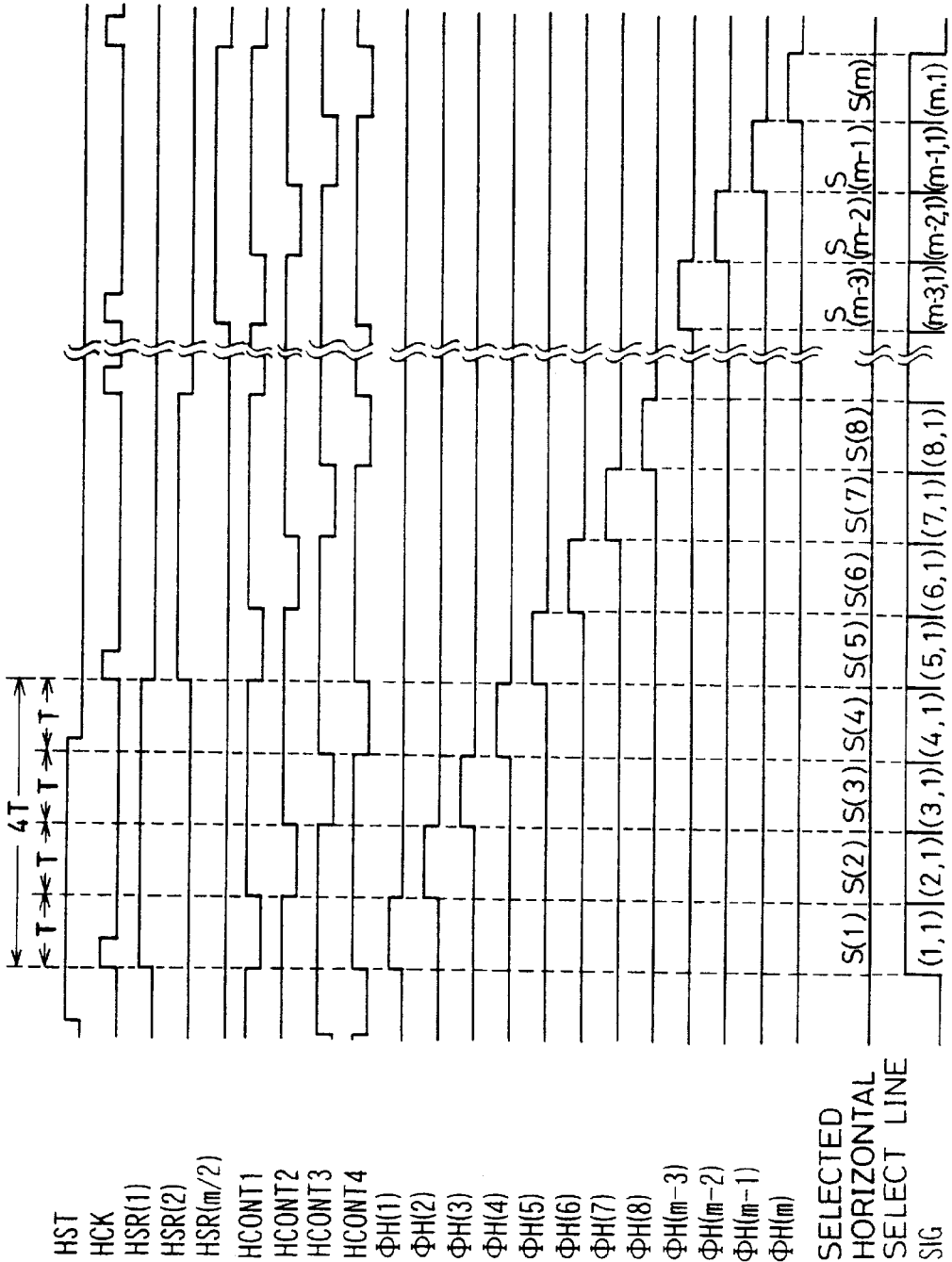
FIG. 22 is a timing chart for explaining readout operation based on yet another form of scan control signal outputted from the scan control section in the second embodiment as shown in FIG. 11.

Referring to a timing chart of FIG. 22, a description is given below of the fact that drive operation similar to that of the conventional example is possible even when the horizontal scanning circuit as shown in FIG. 11 is used in place of the horizontal scanning circuit 100 of the conventional solid-state image pickup apparatus as shown in FIG. 1. This is drive operation of the case where a scan control section constructed to provide scan control signal corresponding to the invention as claimed in claim 7 is employed as the scan control section 6 in FIG. 11. Start pulse HST and clock pulse HCK having a period of 4T(sec) are inputted to the shift register section 1. Output pulses HSR(1), HSR(2), HSR(3), . . . HSR(m/4) to be driven to H-level for time duration of one period of clock pulse HCK are thereby sequentially outputted from the shift register section 1 in synchronization with the rising edge of the clock pulse HCK. Each of the scan control signals HCONT1, HCONT2, HCONT3, HCONT4 for controlling the signal select section 2 is a clock pulse having a period of 4T, and they are sequentially driven to L-level for time duration of T(sec). Since a 2-input NOR circuit provides H-level only when L-level is inputted to both inputs thereof but provides L-level for all other cases, the fact that the scan control signals HCONT1, HCONT2, HCONT3, HCONT4 are driven to L-level in sequence for time period during which the output pulse HSR(1), HSR(2), HSR(3), . . . HSR(m/4) of the shift register section 1 is being at H-level sequentially drives to H-level the outputs ΦH(1), ΦH(2), ΦH(3), . . . ΦH(m) of the signal select section 2 for time period T(sec). Accordingly, the corresponding horizontal select lines S(1), S(2), S(3), . . . S(m) are selected to result in sequential readout of the signal of all pixels (1,1), (2,1), (3,1), . . . (m−1,1), (m,1). By driving in this manner, drive similar to that in the conventional solid-state image pickup apparatus is possible.

Figure 19:
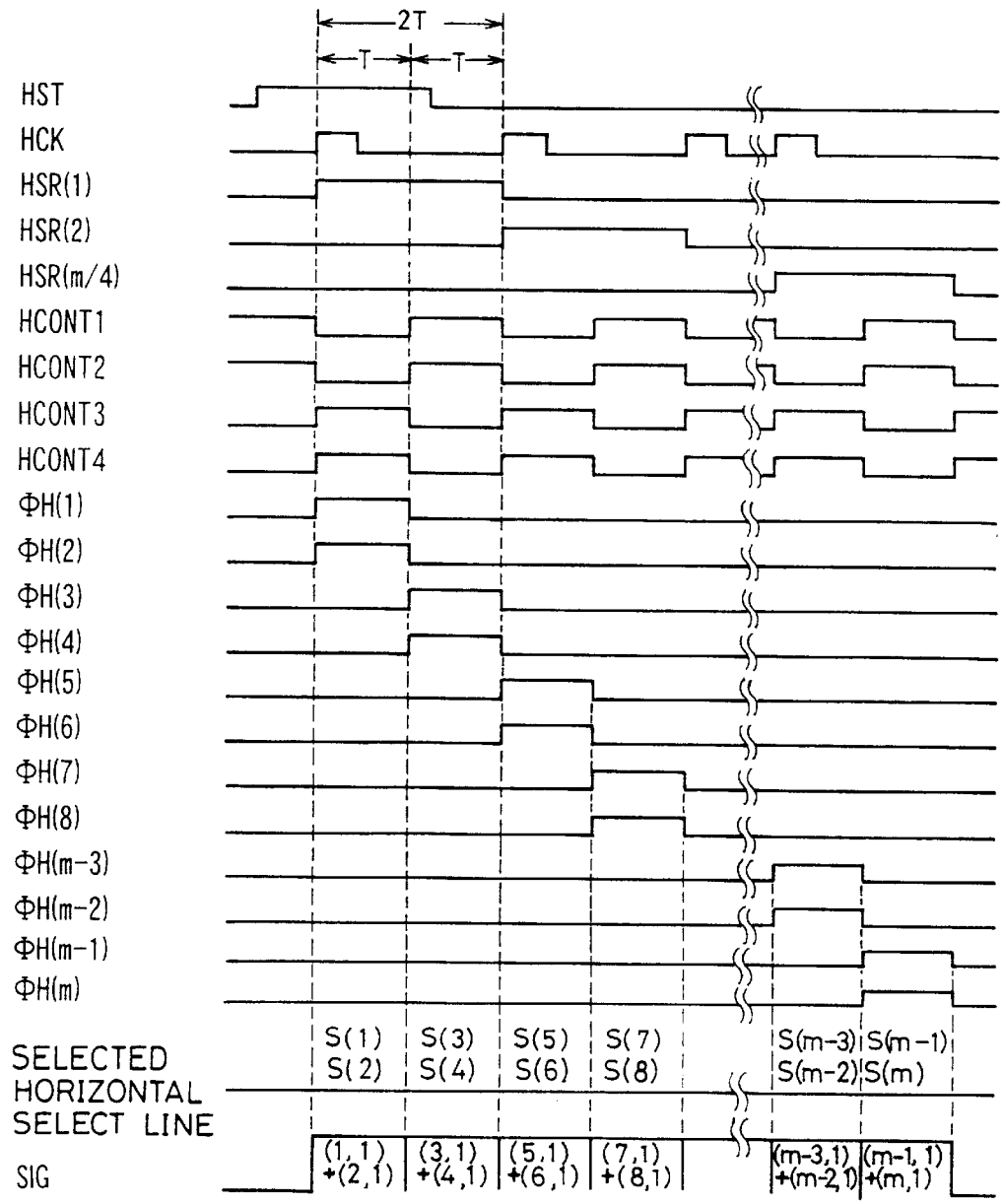
FIG. 19 is a timing chart for explaining readout operation based on yet another form of scan control signal outputted from the scan control section in the second embodiment as shown in FIG. 11.

As has been described, when the drive operation as shown in the timing chart of FIGS. 17 to 19 is executed by using the horizontal scanning circuit having the construction of the second embodiment as shown in FIG. 11, the time required for readout of pixel signals corresponding to a full angle of view in any of the cases is (m/2)×n×T(sec), becoming one half the conventionally required time. Further, according to the drive operation as shown in the timing charts of FIGS. 12 to 15 or 20, the time required for readout of pixel signals corresponding to a full angle of view in any of the cases is (m/4)×n×T(sec), becoming one fourth the conventionally required time. Furthermore, according to drive operation as shown in the timing chart of FIG. 22, drive similar to that in the conventional solid-state image pickup apparatus is possible.

When the solid-state image pickup apparatus according to this embodiment is used as an image input apparatus of a still camera system, pixel signals corresponding to a full angle of view can be read out at a frame rate two times that of the conventional example in adjusting the angle of view and focal point of the taking lens by using the drive operation as shown in the timing chart of FIG. 17, 18 or 19. Also, signals corresponding to a full angle of view can be read out at a frame rate four times that of the conventional example by using drive operation as shown in the timing chart of FIG. 13, 14, 15 or 20. Further, with drive operation as shown in the timing chart of FIGS. 19 and 20: since virtual aperture corresponds to two pixels and four pixels, respectively, occurrence of spurious signals can be suppressed; and, since the signal quantity can be made twice and four times as great, respectively, it can offset a reduction in the signal quantity resulting from the shorter accumulation time. Furthermore, since drive operation similar to that of the conventional solid-state image pickup apparatus is also possible, readout of all pixels can be performed by means of the drive operation as shown in the timing chart of FIG. 22 to obtain a high-definition image, after adjustment of the angle of view and focal point of the taking lens.

In the above first and second embodiments, while no description has been made with respect to the specific construction of the shift register section, any construction having a function for sequentially shifting a pulse can be used. Further, while a case of applying the present invention to a horizontal scanning circuit has been illustrated in the first and second embodiments, it can be naturally also applied to a vertical scanning circuit. Furthermore, when drive method according to the present invention is applied to both horizontal scanning circuit and vertical scanning circuit, yet greater advantage can be achieved due to the fact that signal readout time is shortened in proportion to the multiplication of ratios of reduction in time at respective scanning circuits.

Moreover, while pixels in the above embodiments are shown with respect to a solid-state image pickup apparatus where the pixels are two-dimensionally arrayed in horizontal and vertical directions, the invention is naturally also applicable to a one-dimensional solid-state image pickup apparatus, i.e., a line sensor.

As has been described by way of the above embodiments, according to the invention as claimed in claim 1, pixel signals corresponding to a full angle of view can be read out at a rapid frame rate even in a high-definition solid-state image pickup apparatus having a very large number of pixels. According to the invention as claimed in one of claims 2 to 4, it is readily possible to form scanning signal capable of performing readout of pixel signals at high frame rates in various modes in accordance with scan control signal. According to the invention as claimed in claim 5, pixel signals can be scanned as they are thinned out so as to read out at high frame rates the pixel signals corresponding to a full angle of view. According to the invention as claimed in claim 6, pixel signals corresponding to a full angle of view can be read out at high frame rates by scanning the pixel signals as they are added to one another so that, at even higher frame rates, a weakening in signal level can be inhibited and the virtual aperture of pixels can be increased to suppress spurious signals. According to the invention as claimed in claim 7, sequential scanning signal can be outputted to the output terminals of the signal select unit so that sequential readout of all pixels in a similar manner as that in the conventional solid-state image pickup apparatus is also possible. According to the invention as claimed in claim 8, pixel signals can be scanned as they are thinned out, achieving an advantage similar to that in the invention as claimed in claim 5. According to the invention as claimed in claim 9, pixel signals can be scanned as they are added to one another, achieving an advantage similar to that of the invention as claimed in claim 6.

What is claimed is:

1. A solid-state image pickup apparatus including a pixel section having a plurality of pixels arrayed in both horizontal and vertical directions and a horizontal scanning circuit and a vertical scanning circuit for scanning the pixel section, said solid-state image pickup apparatus comprising:

said horizontal scanning circuit comprising a scanning section arraying a plurality of scanning circuit units each consisting of a shift register unit and a signal select unit having a plurality of output terminals, and a scan control section for controlling said signal select unit, wherein said scanning section having the scanning function corresponding to the respective scanned methods of thinned-out read scan, added read scan and sequential read scan in the direction of column, and said scan control section generating scan control signal for selecting one of said scanning methods to selectively allocate the output of said shift register unit by controlling said signal select unit by the scan control signal so that the scanning section is caused to output scanning signal corresponding to said selected scanning method.

2. The solid-state image pickup apparatus according to claim 1, wherein said signal select unit comprises a plurality of 2-input NOR circuits each having one input thereof to which said scan control signal is inputted and the other input thereof connected in common to which the output signal of said shift register unit is applied, said scanning signals being outputted from respective outputs of the plurality of 2-input NOR circuits.

3. The solid-state image pickup apparatus according to claim 1, wherein said signal select unit comprises a plurality of 2-input NAND circuits each having one input thereof to which said scan control signal is inputted and the other input thereof connected in common to which the output signal of said shift register unit is applied, said scanning signals being outputted from respective outputs of the plurality of 2-input NAND circuits.

4. The solid-state image pickup apparatus according to any one of claims 1 to 3, wherein said scan control section provides said scan control signal for causing the output signal of said shift register unit to be selectively outputted as the scanning signal for thinned-out readout in the direction of column to one terminal of the plurality of output terminals of said signal select unit in a time period during which a select level is being outputted.

5. The solid-state image pickup apparatus according to any one of claims 1 to 3, wherein said scan control section provides said scan control signal for causing the output signal of said shift register unit to be concurrently outputted as the scanning signal for added readout in the direction of column to all of the plurality of output terminals of said signal select unit in a time period during which a select level is being outputted.

6. The solid-state image pickup apparatus according to any one of claims 1 to 3, wherein said scan control section provides said scan control signal for causing the output signal of said shift register unit to be outputted sequentially as the scanning signal for sequential readout in the direction of column to the plurality of output terminals of said signal select unit in a time period during which a select level is being outputted.

7. The solid-state image pickup apparatus according to any one of claims 1 to 4, wherein said scan control section provides said scan control signal for causing the output of said shift register unit to be outputted as said scanning signal at different timings from one another to a plurality of inconsecutive terminals of the plurality of output terminals of said signal select unit in a time period during which a select level is being outputted.

8. The solid-state image pickup apparatus according to any one of claims 1 to 3, wherein said scan control section provides said scan control signal for causing the output signal of said shift register unit to be concurrently outputted as the scanning signal for added readout in the direction of column to a plurality of consecutive terminals of the plurality of output terminals of said signal select unit in a time period during which a select level is being outputted.

* * * * *